US012637847B2

(12) United States Patent
Lance et al.

(10) Patent No.: US 12,637,847 B2
(45) Date of Patent: May 26, 2026

(54) ELECTRONIC PLUMBING SYSTEM INCLUDING SENSOR CONTROL

(71) Applicant: Fortune Brands Water Innovations LLC, North Olmsted, OH (US)

(72) Inventors: Matthew J. Lance, North Ridgevile, OH (US); Matthew Benjamin Nicholls, Rocky River, OH (US)

(73) Assignee: Fortune Brands Water Innovations LLC, Deerfield, IL (US)

( * ) Notice: Subject to any disclaimer, the term of this patent is extended or adjusted under 35 U.S.C. 154(b) by 247 days.

(21) Appl. No.: 18/188,881

(22) Filed: Mar. 23, 2023

(65) Prior Publication Data

US 2023/0304272 A1 Sep. 28, 2023

Related U.S. Application Data

(60) Provisional application No. 63/322,861, filed on Mar. 23, 2022.

(51) Int. Cl.
*E03C 1/05* (2006.01)
*F16K 31/02* (2006.01)
(52) U.S. Cl.
CPC .............. *E03C 1/057* (2013.01); *F16K 31/02* (2013.01)
(58) Field of Classification Search
CPC ................................ E03C 1/057; F16K 31/02
USPC ............................................................ 4/623
See application file for complete search history.

(56) References Cited

U.S. PATENT DOCUMENTS

| | | |
|---|---|---|
| 5,170,361 A | 12/1992 | Reed |
| 5,855,356 A | 1/1999 | Fait |
| 6,513,787 B1 | 2/2003 | Jeromson et al. |
| 7,232,111 B2 | 6/2007 | McDaniel et al. |
| 7,537,195 B2 | 5/2009 | McDaniel et al. |
| 7,651,068 B2 | 1/2010 | Bailey |
| 8,028,355 B2 | 10/2011 | Reeder et al. |
| 8,104,113 B2 | 1/2012 | Rodenbeck et al. |

(Continued)

OTHER PUBLICATIONS

Author unknown, PixArt Imaging PAJ7620U2 General Datasheet—Integrated Gesture Recognition Sensor, version 1.0, dated Mar. 29, 2016, document No. 41002AEN (28 pages).

(Continued)

*Primary Examiner* — Huyen D Le
(74) *Attorney, Agent, or Firm* — Calfee, Halter & Griswold LLP

(57) ABSTRACT

The present invention provides an electronic plumbing system including sensor control. The system comprises a body, an electronic valve, a user input/output module, and a processor. The body is operable to be mounted on a surface and includes a discharge outlet. The discharge outlet is operable to deliver water. The electronic valve is operable to control a parameter for water flowing through the discharge outlet. The user input/output module is operable to communicate with a user regarding a selected value of the parameter for water. The user input/output module includes an activation sensor. The activation sensor is operable to define an activation zone. The activation sensor is operable to detect at least one of a position, movement, and motion of an object in the activation zone. Each position, movement, or motion of the object in the activation zone corresponds to a value of the parameter for water.

20 Claims, 23 Drawing Sheets

(56) References Cited

U.S. PATENT DOCUMENTS

| | | | |
|---|---|---|---|
| 8,407,827 B1 | 4/2013 | Friedman et al. | |
| 8,418,993 B2* | 4/2013 | Chen | G05D 23/193 |
| | | | 700/282 |
| 8,424,568 B2 | 4/2013 | Lang et al. | |
| 8,469,054 B2 | 6/2013 | Lang et al. | |
| 8,807,167 B2 | 8/2014 | Song | |
| 8,827,239 B2 | 9/2014 | Chen | |
| 8,827,240 B2 | 9/2014 | Chen | |
| RE45,373 E | 2/2015 | Allen, Jr. et al. | |
| 8,950,730 B2 | 2/2015 | Bedolla et al. | |
| 9,032,565 B2 | 5/2015 | Loeck et al. | |
| 9,057,183 B2 | 6/2015 | Chen | |
| 9,139,987 B2 | 9/2015 | Bedolla et al. | |
| 9,194,110 B2* | 11/2015 | Frick | E03C 1/055 |
| 9,243,391 B2 | 1/2016 | Jonte et al. | |
| 9,347,207 B2 | 5/2016 | Chen | |
| 9,551,137 B2 | 1/2017 | Chen | |
| 9,624,655 B2 | 4/2017 | Gregory et al. | |
| 9,632,514 B2 | 4/2017 | Marty et al. | |
| 9,702,128 B2 | 7/2017 | Sawaski | |
| 9,783,964 B2 | 10/2017 | Thompson et al. | |
| 9,840,833 B2 | 12/2017 | Chen | |
| 9,920,508 B2 | 3/2018 | Chen | |
| 9,945,103 B2 | 4/2018 | Thompson et al. | |
| 10,036,147 B1 | 7/2018 | Dharamshi et al. | |
| 10,072,403 B2 | 9/2018 | Shirai et al. | |
| 10,125,478 B2 | 11/2018 | Loeck et al. | |
| 10,246,858 B2 | 4/2019 | Wawrla et al. | |
| 10,287,760 B2 | 5/2019 | Sawaski et al. | |
| 10,301,799 B2 | 5/2019 | Thompson et al. | |
| 10,301,801 B2 | 5/2019 | Sawaski | |
| 10,323,393 B2 | 6/2019 | Thompson et al. | |
| 10,544,571 B2* | 1/2020 | Beck | F16K 31/607 |
| 10,550,555 B2 | 2/2020 | Chen | |
| 10,590,636 B2 | 3/2020 | Schoenbeck et al. | |
| 10,837,161 B2 | 11/2020 | Loeck et al. | |
| 10,907,330 B2 | 2/2021 | Zhou et al. | |
| 11,015,327 B2 | 5/2021 | Beck | |
| 2006/0186215 A1 | 8/2006 | Logan | |
| 2008/0256494 A1 | 10/2008 | Greenfield | |
| 2009/0056011 A1 | 3/2009 | Wolf et al. | |
| 2010/0027845 A1 | 2/2010 | Kim et al. | |
| 2011/0186161 A1 | 8/2011 | Chen | |
| 2013/0291978 A1* | 11/2013 | Baker | E03C 1/04 |
| | | | 137/801 |
| 2014/0326321 A1 | 11/2014 | Sawaski et al. | |
| 2015/0268342 A1 | 9/2015 | Iott et al. | |
| 2016/0208467 A1 | 7/2016 | Song | |
| 2016/0273197 A1 | 9/2016 | Gregory et al. | |
| 2016/0333556 A1 | 11/2016 | Veros et al. | |
| 2016/0340879 A1 | 11/2016 | Chen | |
| 2017/0068228 A1 | 3/2017 | Schoenbeck et al. | |
| 2017/0218608 A1 | 8/2017 | Chen | |
| 2017/0254055 A1 | 9/2017 | Xia | |
| 2017/0292253 A1 | 10/2017 | Chen | |
| 2018/0291600 A1 | 10/2018 | Beck et al. | |
| 2018/0328011 A1 | 11/2018 | Chen | |
| 2019/0087510 A1 | 3/2019 | Rexach et al. | |
| 2019/0089550 A1 | 3/2019 | Rexach et al. | |
| 2019/0162426 A1 | 5/2019 | Wang et al. | |
| 2019/0334738 A1 | 10/2019 | Seymour et al. | |
| 2020/0209897 A1* | 7/2020 | Smith | E03C 1/057 |
| 2020/0340222 A1 | 10/2020 | Polly et al. | |
| 2020/0354932 A1 | 11/2020 | Gunawardena et al. | |
| 2020/0356124 A1* | 11/2020 | Bresson | E03C 1/0412 |
| 2021/0148102 A1 | 5/2021 | Zhou et al. | |
| 2022/0307245 A1* | 9/2022 | Kinicki | H04L 12/282 |

OTHER PUBLICATIONS

International Search Report for International App. No. PCT/US2022/021552 dated Jul. 29, 2022 (2 pages).

Written Opinion of the International Searching Authority of International App. No. PCT/US2022/021552 dated Jul. 29, 2022 (5 pages).

Author unknown, Say Hello To Your New Kitchen Assistant: The U By Moen Smart Faucet, Moen Press Release (available at https://www.moen.com/press-room/press-releases/u-by-moen-smart-faucet—retrieved on Jun. 20, 2022), Jan. 21, 2020 (3 pages).

Author unknown, PixArt Imaging PAJ7620U2 Module Web Page (available at https://www.pixart.com/products-detail/37/PAJ7620U2—retrieved on Jun. 13, 2023), the product shown in the Web Page is believed to have been publicly available prior to Mar. 23, 2021 (3 pages).

International Search Report for International App. No. PCT/US2023/064853 dated Aug. 15, 2023 (4 pages).

Written Opinion of the International Searching Authority for International App. No. PCT/US2023/064853 dated Aug. 15, 2023 (11 pages).

Author unknown, Moen Smart Faucet with Motion Control, KBB Publication (available at https://www.kbbonline.com/products/kitchen-faucets-sinks/moen-smart-faucet-motion-control/—retrieved on Dec. 22, 2023), Jan. 5, 2022 (4 pages).

Author unknown, Moen Smart Faucet with Gesture Control, CES Publication (available at https://www.ces.tech/innovation-awards/honorees/2022/honorees/m/moen-smart-faucet-with-gesture-control.aspx—retrieved on Dec. 22, 2023), 2022 (2 pages).

Office Action issued by U.S. Patent and Trademark Office for U.S. Appl. No. 17/702,369 dated May 10, 2024 (64 pages).

* cited by examiner

38a

38a

38a

38b

| Activation Subzone - X Dimension | 1 | 2 | 3 | 4 | 5 | 6 | 7 | 8 | 9 | 10 | 11 | 12 |
|---|---|---|---|---|---|---|---|---|---|---|---|---|
| Temperature | C | 65°F | 70°F | 75°F | 80°F | 85°F | 90°F | 95°F | 100°F | 105°F | 110°F | H |

C - coldest temperature available
H - hottest temperature available

Figure 8

| Activation Subzone - Y Dimension | 1 | 2 | 3 | 4 |
|---|---|---|---|---|
| Flow Rate | 25% | 50% | 75% | 100% |

Figure 9

| Activation Subzone- Z Dimension | 1 | 2 |
|---|---|---|
| Spray Pattern | Spray | Stream |

Figure 10

| Dark Red | Light Red | Light Purple | Active | Dark Purple | Light Blue | Dark Blue |
|---|---|---|---|---|---|---|

Figure 11a

| Dark Red | Light Red | Light Purple | Active | Dark Purple | Light Blue | Dark Blue |
|---|---|---|---|---|---|---|

Figure 11b

| Dark Red | Light Red | Light Purple | Active | Dark Purple | Light Blue | Dark Blue |
|---|---|---|---|---|---|---|

Figure 11c

| Dark Red | Light Red | Light Purple | Dark Purple | Light Blue | Dark Blue |
|---|---|---|---|---|---|

Active

Figure 11d

| Dark Red | Light Red | Light Purple | Dark Purple | Light Blue | Dark Blue |
|---|---|---|---|---|---|

Active

Figure 11e

| Dark Red | Light Red | Light Purple | Dark Purple | Light Blue | Dark Blue |
|---|---|---|---|---|---|

Active

Figure 11f

| Active | |
|---|---|
| Current Values | |
| Temperature | Flow Rate |
| 60°F | 50% |
| Selected Values | |
| Temperature | Flow Rate |
| 110°F | 100% |

Figure 12a

| Hold | |
|---|---|
| Current Values | |
| Temperature | Flow Rate |
| 70°F | 60% |
| Selected Values | |
| Temperature | Flow Rate |
| 110°F | 100% |

Figure 12b

| Hold | |
|---|---|
| Current Values | |
| Temperature | Flow Rate |
| 80°F | 70% |
| Selected Values | |
| Temperature | Flow Rate |
| 110°F | 100% |

Figure 12c

| Hold | |
|---|---|
| Current Values | |
| Temperature | Flow Rate |
| 90°F | 80% |
| Selected Values | |
| Temperature | Flow Rate |
| 110°F | 100% |

Figure 12d

| Hold | |
|---|---|
| Current Values | |
| Temperature | Flow Rate |
| 100°F | 90% |
| Selected Values | |
| Temperature | Flow Rate |
| 110°F | 100% |

Figure 12e

| Hold | |
|---|---|
| Current Values | |
| Temperature | Flow Rate |
| 110°F | 100% |
| Selected Values | |
| Temperature | Flow Rate |
| 110°F | 100% |

Figure 12f

ELECTRONIC PLUMBING SYSTEM INCLUDING SENSOR CONTROL

CROSS-REFERENCE TO RELATED APPLICATION

This application claims the benefit of U.S. Provisional Application No. 63/322,861, filed Mar. 23, 2022, the entire disclosure of which is hereby incorporated by reference.

FIELD

The present invention relates generally to an electronic plumbing system including sensor control and, more particularly, to an electronic plumbing system including sensor control with spatial tracking and feedback.

BACKGROUND

Electronic plumbing systems, such as electronic faucets and electronic showers, are well known. Such electronic plumbing systems are used in residential and commercial applications, such as in kitchens, bathrooms, and various other locations. Users desire to use electronic plumbing systems. Many difficulties can be encountered in using electronic plumbing systems.

SUMMARY

The present invention provides an electronic plumbing system including sensor control with spatial tracking and feedback.

In an exemplary embodiment, the system comprises a body, an electronic valve, a user input/output module, and a processor. The body is operable to be mounted on a surface. The body includes a discharge outlet. The discharge outlet is operable to deliver water. The electronic valve is operable to permit flow of water through the discharge outlet when the electronic valve is activated and to not permit flow of water through the discharge outlet when the electronic valve is deactivated. The electronic valve is operable to control a parameter for water flowing through the discharge outlet. The user input/output module is operable to communicate with a user regarding a selected value of the parameter for water. The user input/output module includes an activation sensor. The activation sensor is operable to define an activation zone. The activation sensor is operable to detect at least one of a position, movement, and motion of an object in the activation zone. Each position, movement, or motion of the object in the activation zone corresponds to a value of the parameter for water. The processor is operable to communicate with each of the electronic valve and the user input/output module regarding the selected value of the parameter for water. The activation sensor is operable to detect the position, movement, or motion of the object in the activation zone and to send a signal to the processor indicating the detected position, movement, or motion of the object in the activation zone. The processor is operable to receive the signal from the activation sensor indicating the detected position, movement, or motion of the object in the activation zone and to send a signal to the electronic valve indicating the selected value of the parameter for water corresponding to the detected position, movement, or motion of the object in the activation zone. The electronic valve is operable to receive the signal from the processor indicating the selected value of the parameter for water and to flow the selected value of the parameter for water.

In an exemplary embodiment, the system comprises a body, an electronic valve, a user input/output module, and a processor. The body is operable to be mounted on a surface. The body includes a discharge outlet. The discharge outlet is operable to deliver water. The electronic valve is operable to permit flow of water through the discharge outlet when the electronic valve is activated and to not permit flow of water through the discharge outlet when the electronic valve is deactivated. The electronic valve is operable to control a parameter for water flowing through the discharge outlet. The user input/output module is operable to communicate with a user regarding a selected value of the parameter for water. The user input/output module includes an activation sensor. The activation sensor is operable to define an activation zone. The activation sensor is operable to detect at least one of a position, movement, and motion of an object in the activation zone. Each position, movement, or motion of the object in the activation zone corresponds to a value of the parameter for water. The processor is operable to communicate with each of the electronic valve and the user input/output module regarding the selected value of the parameter for water. The system has an active system state, a hold system state, and an inactive system state. In the active system state, water is being delivered through the discharge outlet and the position, movement, or motion of the object in the activation zone is determining the selected value of the parameter for water. In the hold system state, water is being delivered through the discharge outlet and the position, movement, or motion of the object in the activation zone is not determining the selected value of the parameter for water. In the inactive system state, water is not being delivered through the discharge outlet.

In an exemplary embodiment, the system comprises a body, an electronic valve, a user input/output module, and a processor. The body is operable to be mounted on a surface. The body includes a discharge outlet. The discharge outlet is operable to deliver water. The electronic valve is operable to permit flow of water through the discharge outlet when the electronic valve is activated and to not permit flow of water through the discharge outlet when the electronic valve is deactivated. The electronic valve is operable to control a parameter for water flowing through the discharge outlet. The user input/output module is operable to communicate with a user regarding a selected value of the parameter for water. The user input/output module includes an activation sensor. The activation sensor is operable to define an activation zone. The activation sensor is operable to detect at least one of a position, movement, and motion of an object in the activation zone. Each position, movement, or motion of the object in the activation zone corresponds to a value of the parameter for water. The processor is operable to communicate with each of the electronic valve and the user input/output module regarding the selected value of the parameter for water. The system has an active system state, a hold system state, and an inactive system state. In the active system state, water is being delivered through the discharge outlet and the position, movement, or motion of the object in the activation zone is determining the selected value of the parameter for water. In the hold system state, water is being delivered through the discharge outlet and the position, movement, or motion of the object in the activation zone is not determining the selected value of the parameter for water. In the inactive system state, water is not being delivered through the discharge outlet. The system is operable to enter the active system state when the system is in the inactive system state or the hold system state and detects an activation sequence. The system is operable to enter the hold system state when the system is in the active system state and detects a hold sequence. The system is operable to enter the inactive system state when the system is in the active system state or the hold system state and detects a deactivation sequence.

BRIEF DESCRIPTION OF THE DRAWINGS

FIGS. 3*a*-1-3*a*-3 and 3*b*-1-3*b*-3 are illustrations of electronic plumbing systems, including electronic faucets, according to exemplary embodiments of the present invention—FIGS. 3*a*-1-3*a*-3 include activation sensor/display assemblies, a handle, and a parameter/position sensor, and FIGS. 3*b*-1-3*b*-3 include the activation sensor/display assemblies, but do not include a handle or a parameter/position sensor;

—FIGS. 4*a*-4*c* show the activation sensor mounted on a front of a spout;

—FIG. 5 shows the activation display mounted on a front of a spout;

FIG. 8 is a schematic illustration of activation subzones in an X dimension of the three-dimensional activation zone of FIG. 7;

FIG. 9 is a schematic illustration of activation subzones in a Y dimension of the three-dimensional activation zone of FIG. 7;

FIG. 10 is a schematic illustration of activation subzones in a Z dimension of the three-dimensional activation zone of FIG. 7;

FIGS. 11*a*-11*f* are schematic illustrations of an activation display of an activation sensor/display assembly including illuminated indicators according to an exemplary embodiment of the present invention;

FIGS. 12*a*-12*f* are schematic illustrations of an activation display of an activation sensor/display assembly including textual/numeric indicators according to an exemplary embodiment of the present invention.

DETAILED DESCRIPTION

The present invention provides an electronic plumbing system including sensor control with spatial tracking and feedback. In exemplary embodiments, the electronic plumbing system includes an electronic faucet. However, one of ordinary skill in the art will appreciate that the electronic plumbing system could include other electronic plumbing devices, such as an electronic shower, an electronic showerhead, an electronic handheld shower, an electronic body spray, and an electronic side spray.

Figure 1:
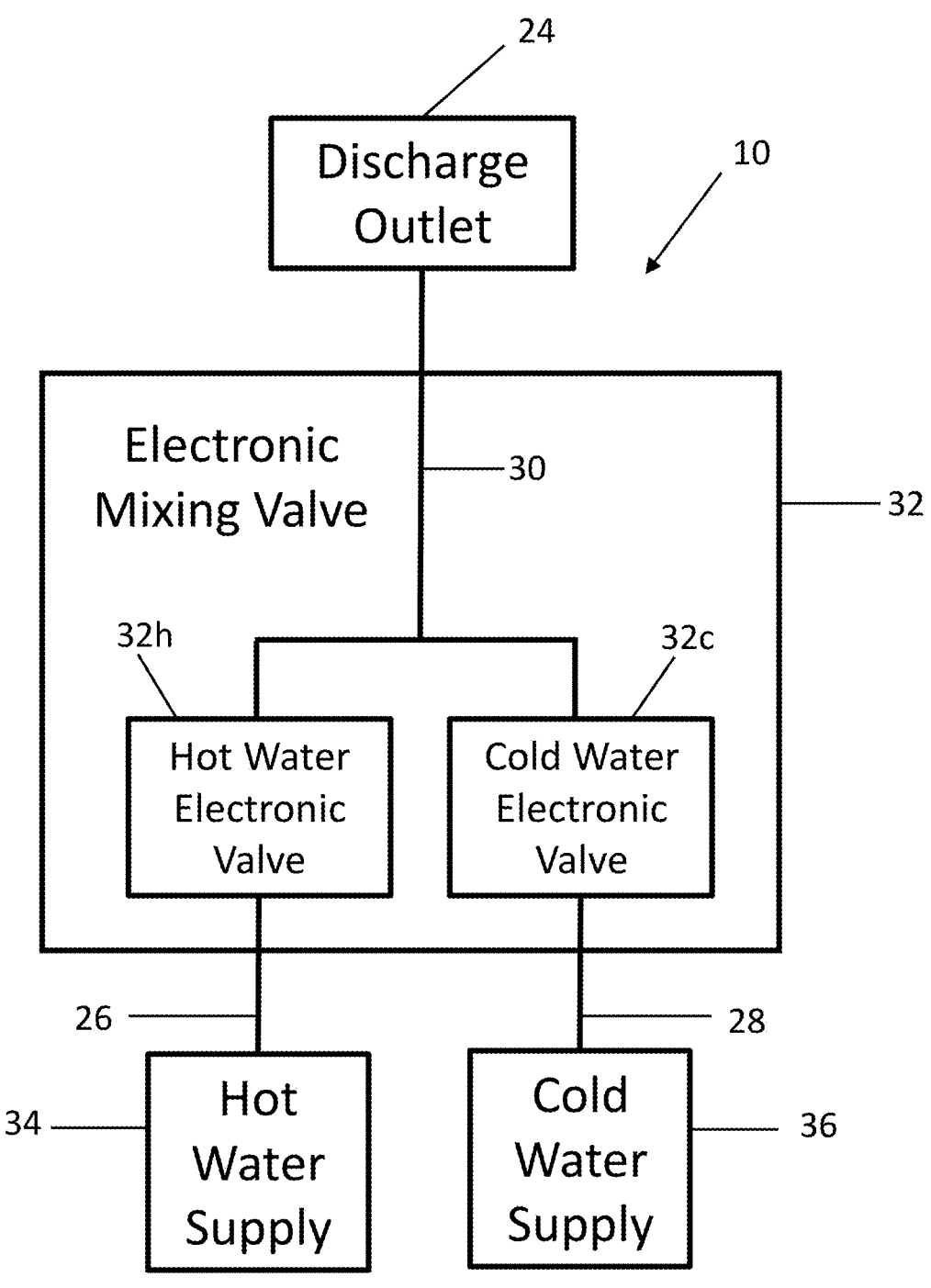
FIG. 1 is a schematic illustration of fluidic components of an electronic plumbing system according to an exemplary embodiment of the present invention.
Figure 2A:
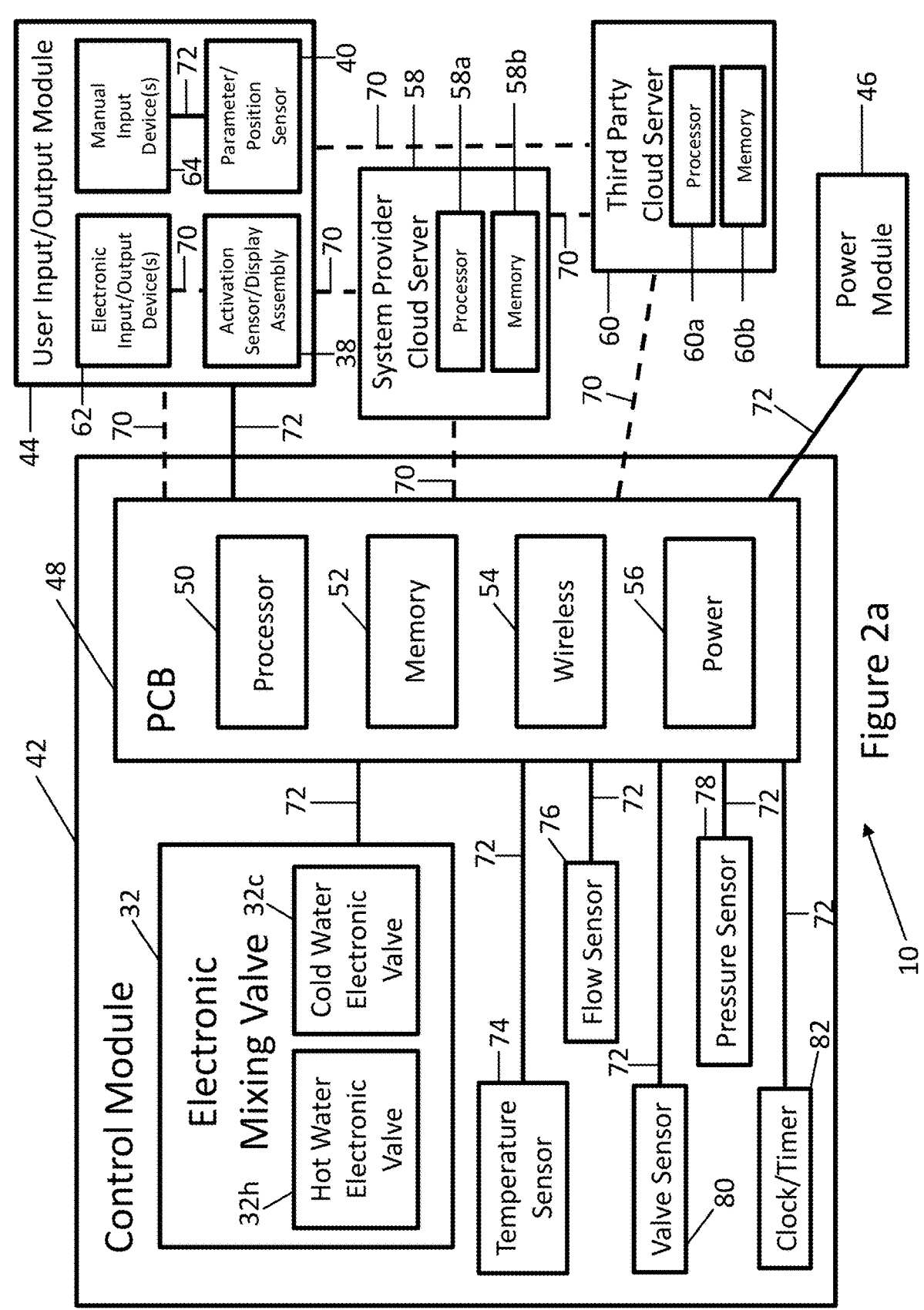
FIGS. 2*a* and 2*b* are schematic illustrations of electrical/electronic components of electronic plumbing systems according to exemplary embodiments of the present invention—FIG. 2*a* includes a manual input device(s) and a parameter/position sensor, and FIG. 2*b* does not include a manual input device(s) or a parameter/position sensor.
Figure 2B:
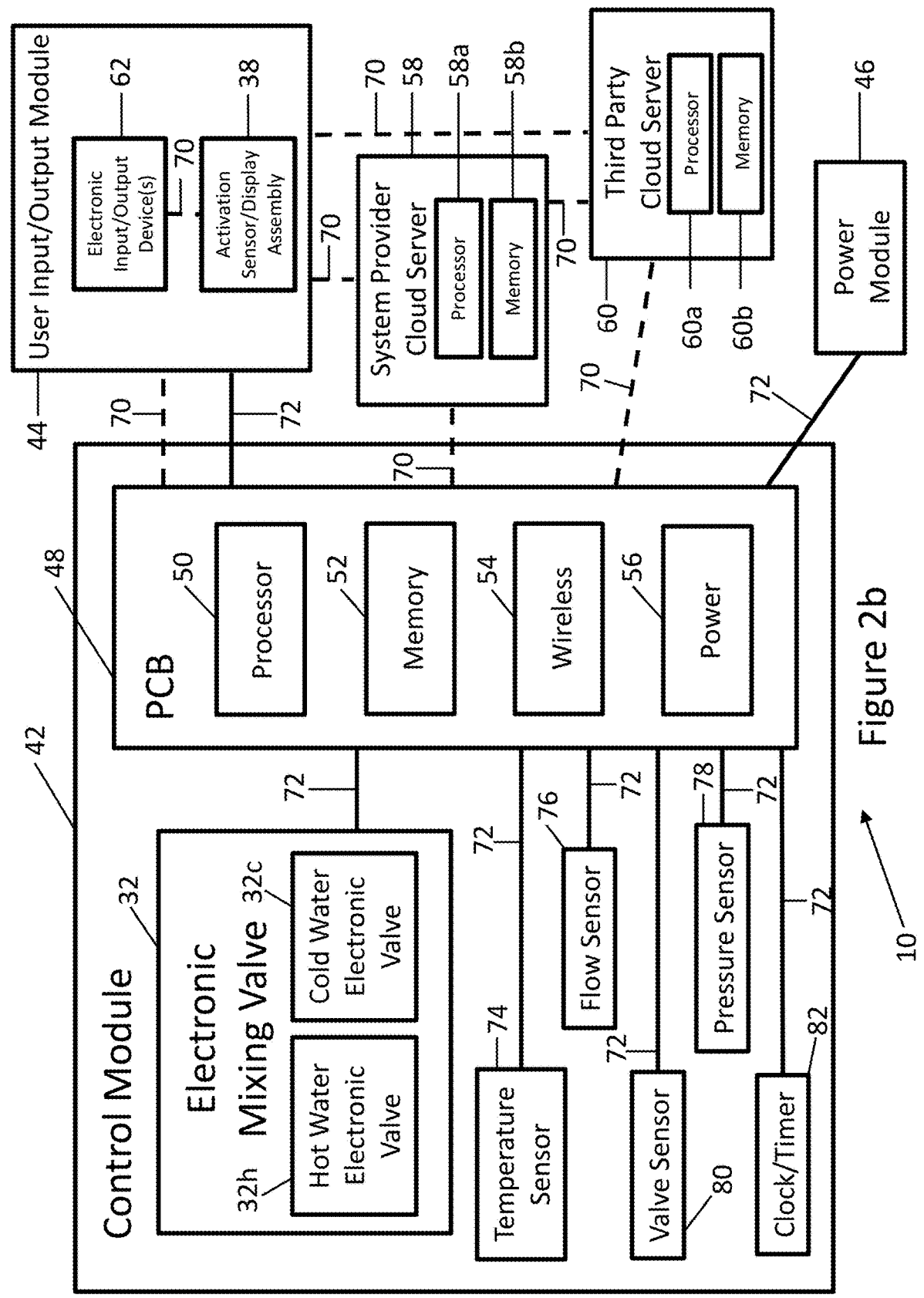

Exemplary embodiments of electronic plumbing systems 10 are illustrated in FIGS. 1 and 2*a*-2*b*. FIG. 1 primarily shows the fluidic components and connections of the electronic plumbing systems 10, and FIGS. 2*a*-2*b* primarily show the electrical/electronic components and connections of the electronic plumbing systems 10. Exemplary embodiments of electronic plumbing systems 10 including electronic faucets 12 are illustrated in FIGS. 3*a*-1-3*a*-3 and 3*b*-1-3*b*-3. FIGS. 3*a*-1-3*a*-3 and 3*b*-1-3*b*-3 show the fluidic and electrical/electronic components of the electronic plumbing systems 10 including electronic faucets 12.

Figures 1, 3A:
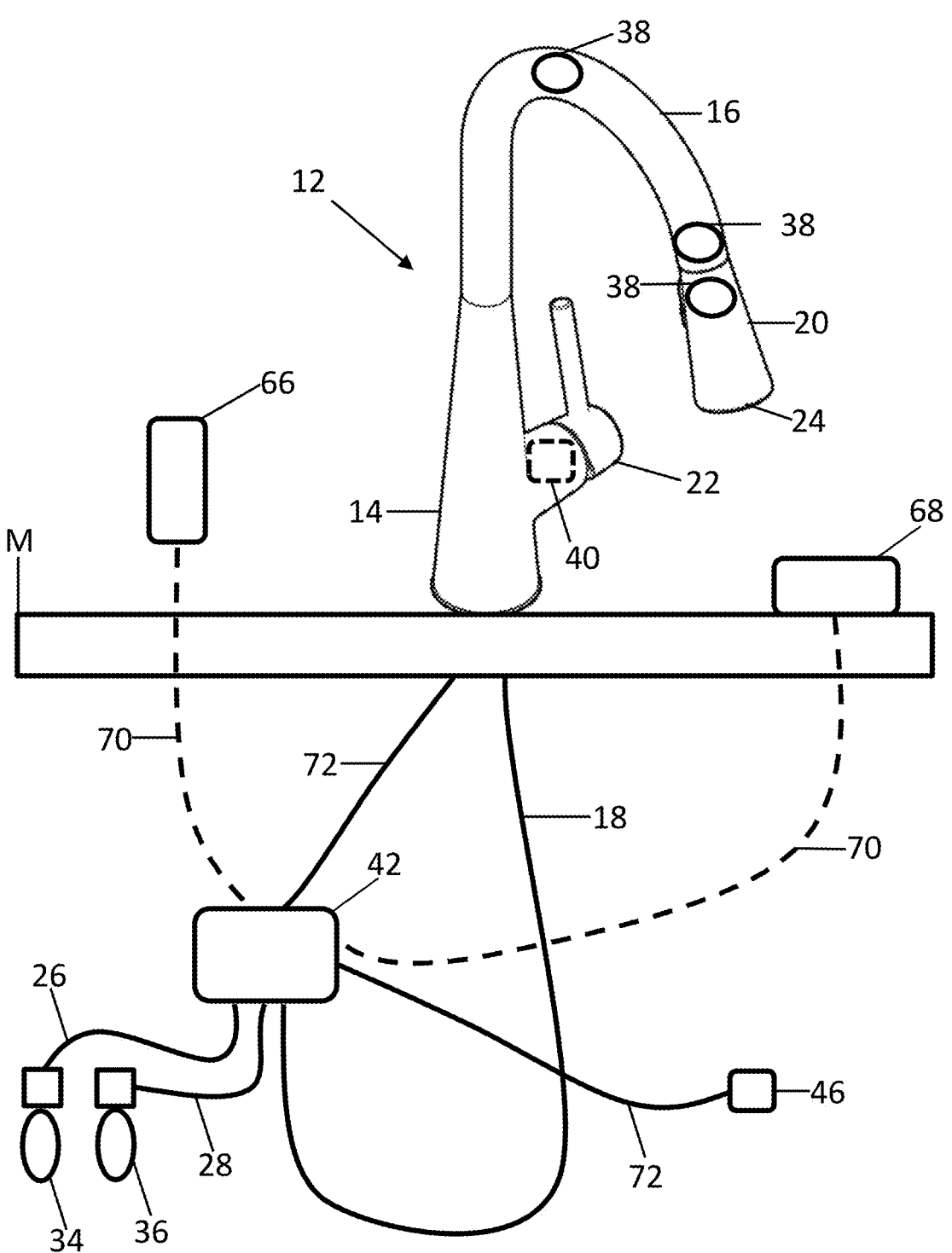
Figures 2, 3A:
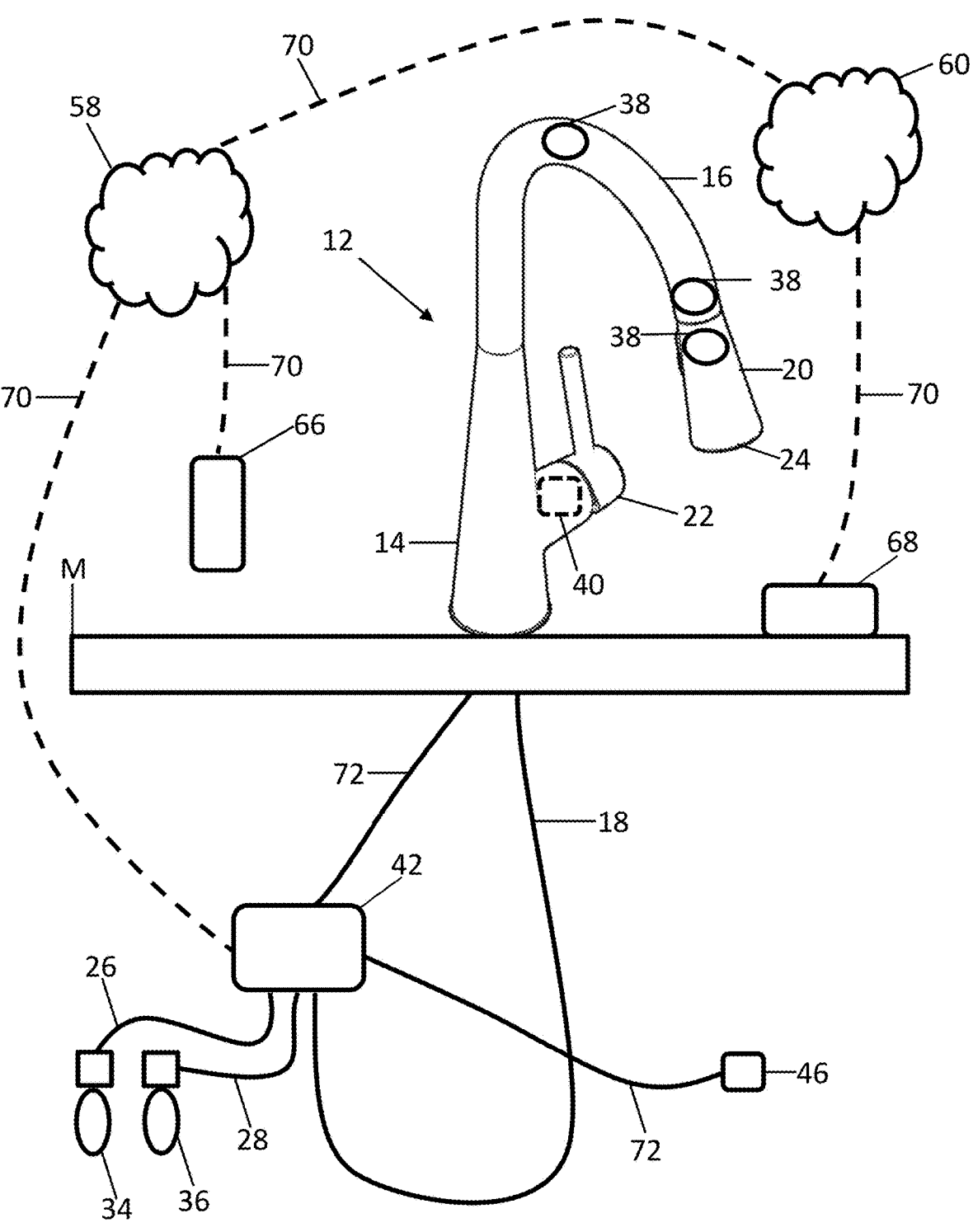
Figures 3, 3A:
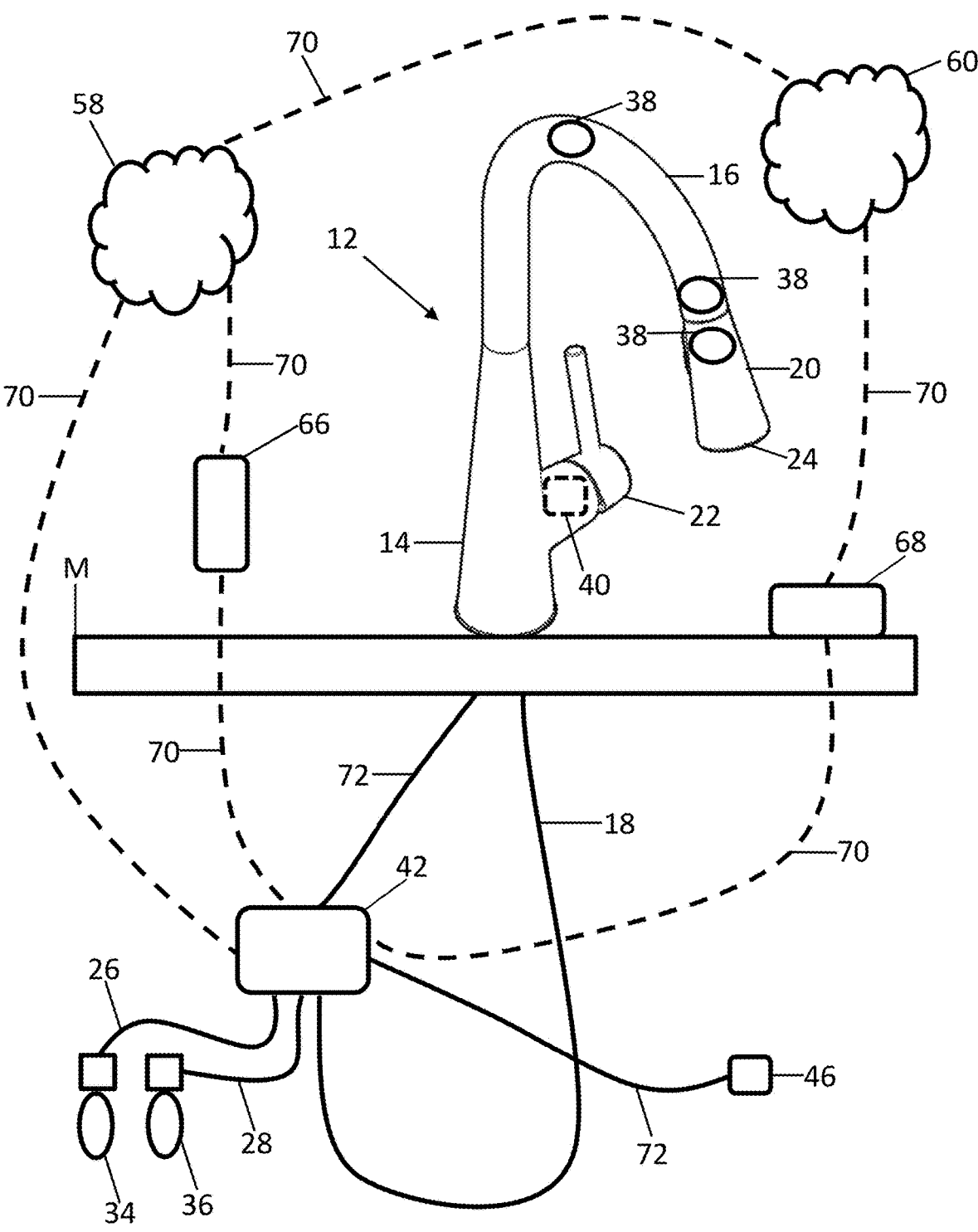
Figures 1, 3B:
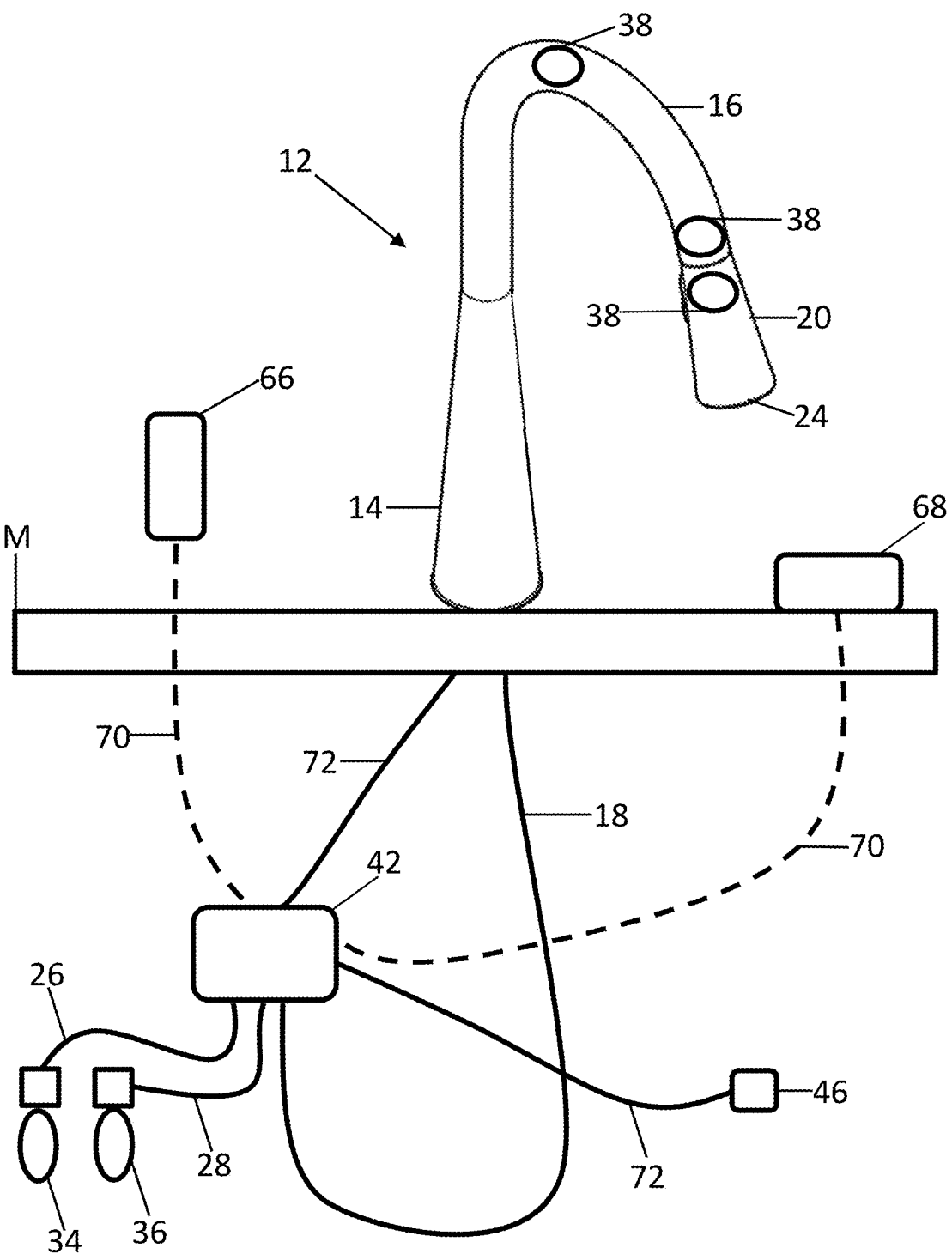
Figures 2, 3B:
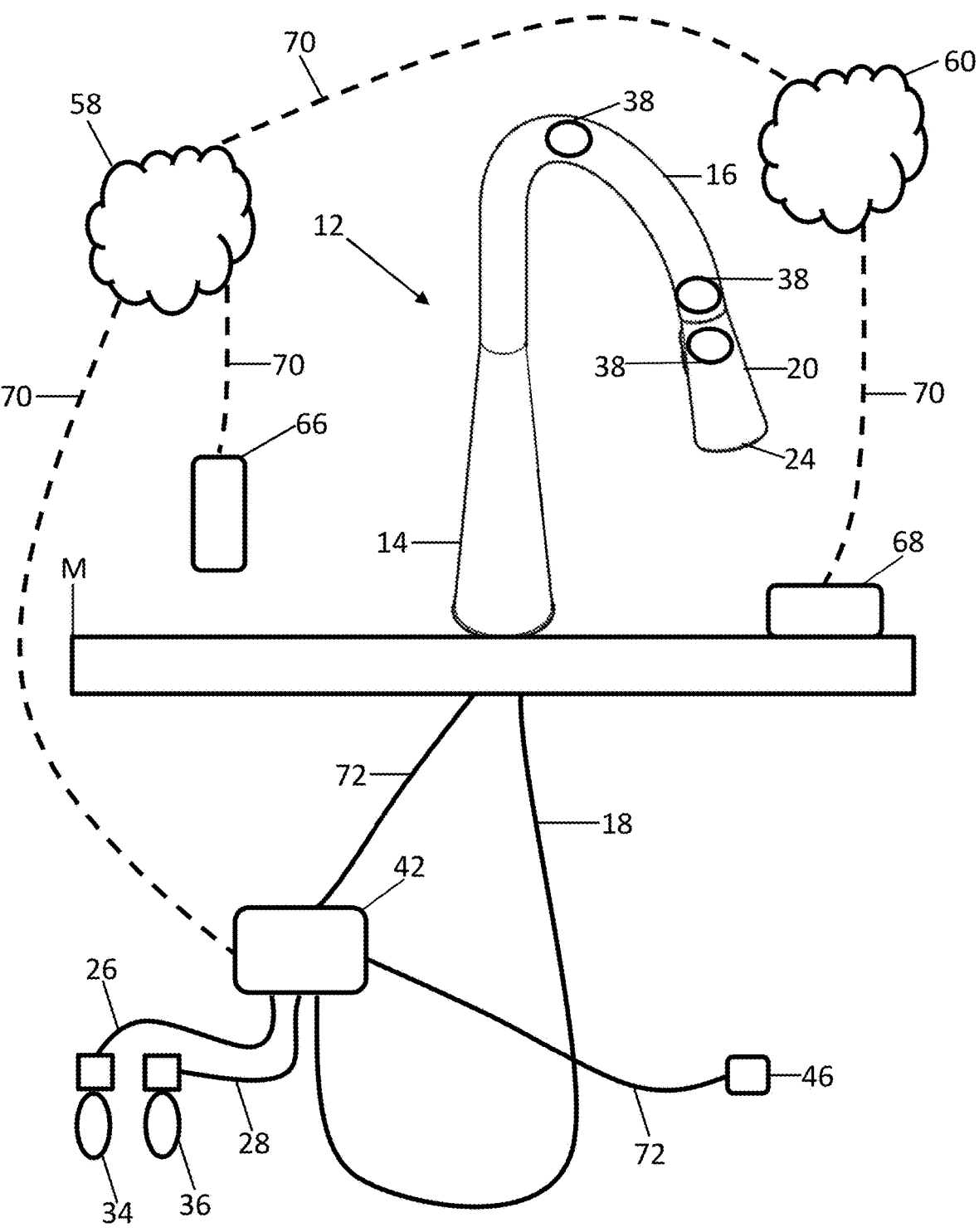
Figures 3, 3B:
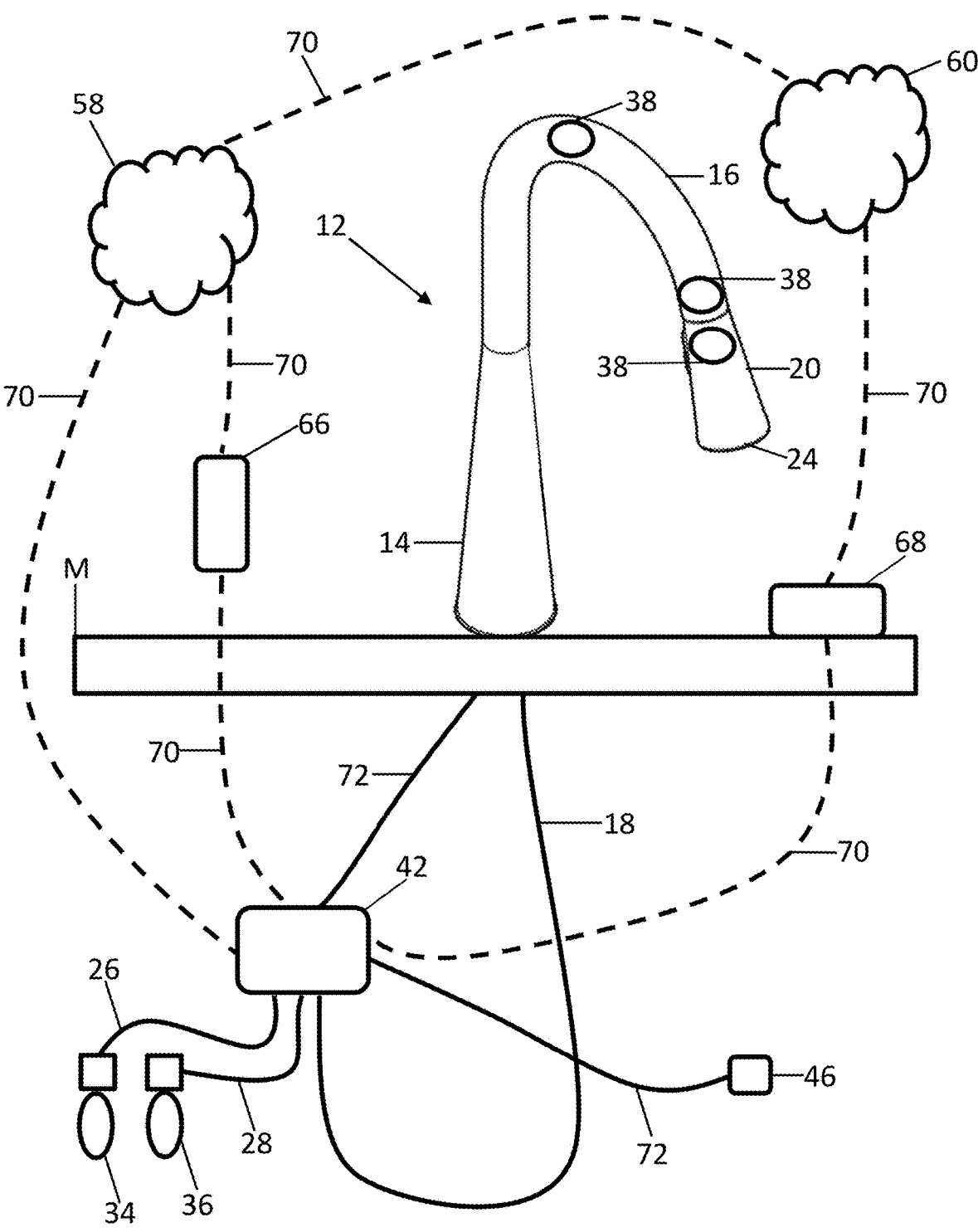

In the illustrated embodiments, as best shown in FIGS. 3*a*-1-3*a*-3, the electronic faucet 12 includes a hub 14, a spout 16, a wand hose 18, a wand 20, and a handle 22. An upstream end of the hub 14 is connected to a mounting surface M (such as a counter or sink). An upstream end of the spout 16 is connected to a downstream end of the hub 14. The spout 16 is operable to rotate relative to the hub 14. The wand hose 18 extends through the hub 14 and the spout 16 and is operable to move within the hub 14 and the spout 16. An upstream end of the wand 20 is mounted in a downstream end of the spout 16 and is connected to a downstream end of the wand hose 18. A downstream end of the wand 20 includes a discharge outlet 24. The discharge outlet 24 is operable to deliver water from the electronic faucet 12. The wand 20 is operable to pull away from the spout 16. Pull-out and pull-down wands are well-known in the art and, thus, the operation thereof will not be described in greater detail. The handle 22 is connected to a side of the hub 14 and is operable to move relative to the hub 14. Although the electronic faucet 12 has been described as having a rotatable spout 16 and a handle 22 mounted on the hub 14, one of ordinary skill in the art will appreciate that, in certain embodiments, the spout 16 could be fixed relative to the hub 14, the handle 22 could be mounted on other locations on the electronic faucet 12 or remote from the electronic faucet 12, the electronic faucet 12 could include more than one handle 22, the handle 22 could be any mechanical actuation device or user interface, and/or the electronic faucet 12 may not include the handle 22. The embodiments in which the electronic faucet 12 does not include the handle 22 are shown in FIGS. 3*b*-1-3*b*-3. In the illustrated embodiments, the hub 14, the spout 16, and the wand 20 together form a body. However, one of ordinary skill in the art will appreciate that the body does not need to include each of these components. In exemplary embodiments, the body is operable to be mounted on a surface, and the body includes the discharge outlet 24.

Additionally, in the illustrated embodiments, as best shown in FIGS. 1, 3*a*-1-3*a*-3, and 3*b*-1-3*b*-3, the electronic plumbing system 10 includes a hot water line 26, a cold water line 28, a mixed water line 30, and an electronic valve 32. The electronic valve 32 is operable to permit flow of water through the discharge outlet 24 when the electronic valve 32 is activated and to not permit flow of water through the discharge outlet 24 when the electronic valve 32 is deactivated. In exemplary embodiments, the electronic valve 32 is operable to control a parameter for water flowing through the discharge outlet 24. In the illustrated embodiments, the electronic valve 32 is an electronic mixing valve that includes a hot water electronic valve 32*h* and a cold water electronic valve 32*c*.

An upstream end of the hot water line 26 connects to a hot water supply 34, and an upstream end of the cold water line 28 connects to a cold water supply 36. A downstream end of the hot water line 26 connects to the electronic valve 32, and a downstream end of the cold water line 28 connects to the electronic valve 32. More particularly, a downstream end of the hot water line 26 connects to the hot water electronic valve 32*h*, and a downstream end of the cold water line 28 connects to the cold water electronic valve 32*c*.

An upstream end of the mixed water line 30 connects to the electronic valve 32. More particularly, an upstream end of the mixed water line 30 connects to the hot water electronic valve 32*h* and the cold water electronic valve 32*c*. A downstream end of the mixed water line 30 connects to the discharge outlet 24. In the illustrated embodiments, at least a portion of the mixed water line 30 is the wand hose 18. As stated above, the downstream end of the wand hose 18 connects to the upstream end of the wand 20, and the downstream end of the wand 20 includes the discharge outlet 24 through which water is delivered from the electronic faucet 12.

In the illustrated embodiments, each portion of the hot water line 26, the cold water line 28, and the mixed water line 30 is shown as including at least one hose, pipe, or passage. However, one of ordinary skill in the art will appreciate that each portion of the hot water line 26, the cold water line 28, and the mixed water line 30 could include more than one hose, pipe, or passage. Similarly, each portion of the hot water line 26, the cold water line 28, and the mixed water line 30 could include a combination of hose(s), pipe(s), and/or passage(s). In exemplary embodiments, the hoses are flexible hoses. However, one of ordinary skill in the art will appreciate that other types of hoses could be used. If a portion of the hot water line 26, the cold water line 28, or the mixed water line 30 includes more than one hose, pipe, and/or passage, the hose(s), pipe(s), and/or passage(s) are connected via connectors. In exemplary embodiments for the flexible hoses, the connectors are push-fit connectors. However, one of ordinary skill in the art will appreciate that other types of connectors could be used.

When reference is made to one component of the electronic plumbing system 10 connecting to another component of the electronic plumbing system 10, the connection may be direct or indirect. One of ordinary skill in the art will appreciate that additional components may be needed if the connection is indirect.

In the illustrated embodiments, the electronic plumbing system 10 includes the electronic valve 32 and, more particularly, the hot water electronic valve 32*h* and the cold water electronic valve 32*c*. However, one of ordinary skill in the art will appreciate that the electronic plumbing system 10 could include one or more electronic valves. Additionally, the electronic plumbing system 10 could include one or more mechanical valves, either in parallel or in series with the electronic valve(s). Further, although the electronic plumbing system 10 has been described as including the electronic valve 32 that is an electronic mixing valve, one of ordinary skill in the art will appreciate that the electronic plumbing system 10 could include just the hot water electronic valve 32*h* or just the cold water electronic valve 32*c*.

In exemplary embodiments, the hot water electronic valve 32*h* and the cold water electronic valve 32*c* are proportional valves and, more specifically, stepper motor actuated valves. However, one of ordinary skill in the art will appreciate that the hot water electronic valve 32*h* and the cold water electronic valve 32*c* could be any type of electronic valves, including, but not limited to, solenoid valves and electronic throttle valves.

Further, in the illustrated embodiments, as best shown in FIGS. 2*a*-2*b*, 3*a*-1-3*a*-3, 3*b*-1-3*b*-3, 4*a*-4*c*, and 5, the electronic plumbing system 10 includes an activation sensor/display assembly 38. In the illustrated embodiments, as best shown in FIGS. 3*a*-1-3*a*-3, 3*b*-1-3*b*-3, 4*a*-4*c*, and 5, the electronic faucet 12 includes the activation sensor/display assembly 38. In exemplary embodiments, the activation sensor/display assembly 38 is operable to be mounted on the electronic plumbing system 10, such as the electronic faucet 12. In the illustrated embodiments, as best shown in FIGS. 3*a*-1-3*a*-3, 3*b*-1-3*b*-3, 4*a*-4*c*, and 5, the activation sensor/display assembly 38 is mounted on the spout 16 and/or on the wand 20 of the electronic faucet 12. More specifically, in the illustrated embodiments of FIGS. 3*a*-1-3*a*-3 and 3*b*-1-3*b*-3, the activation sensor/display assembly 38 is mounted on an apex of the spout 16, on a front of the spout 16, and on the wand 20; in the illustrated embodiments of FIGS. 4*a*-4*c*, the activation sensor/display assembly 38 is mounted on the front of the spout 16; and in the illustrated embodiment of FIG. 5, the activation sensor/display assembly 38 is mounted on the front of the spout 16. However, one of ordinary skill in the art will appreciate that the activation sensor/display assembly 38 could be mounted in any one or more of these and/or other locations on and/or around the electronic plumbing system 10.

In the illustrated embodiments, as best shown in FIGS. 3*a*-1-3*a*-3, 3*b*-1-3*b*-3, and 4*a*-4*c*, the activation sensor/display assembly 38 includes an activation sensor 38*a*. The activation sensor 38*a* is commonly referred to as a gesture sensor. In the illustrated embodiments, as best shown in FIGS. 3*a*-1-3*a*-3, 3*b*-1-3*b*-3, and 4*a*-4*c*, the electronic faucet 12 includes the activation sensor 38*a*. In exemplary embodiments, the activation sensor 38*a* is operable to be mounted on the electronic plumbing system 10, such as the electronic faucet 12. In the illustrated embodiments, as best shown in FIGS. 3*a*-1-3*a*-3, 3*b*-1-3*b*-3, and 4*a*-4*c*, the activation sensor 38*a* is mounted on the spout 16 and/or on the wand 20 of the electronic faucet 12. More specifically, in the illustrated embodiments of FIGS. 3*a*-1-3*a*-3 and 3*b*-1-3*b*-3, the activation sensor 38*a* is mounted on the apex of the spout 16, on the front of the spout 16, and on the wand 20; and in the illustrated embodiments of FIGS. 4*a*-4*c*, the activation sensor 38*a* is mounted on the front of the spout 16. However, one of ordinary skill in the art will appreciate that the activation sensor 38*a* could be mounted in any one or more of these and/or other locations on and/or around the electronic plumbing system 10.

The activation sensor 38*a* is operable to define an activation zone. In exemplary embodiments, the activation sensor 38*a* is operable to activate, deactivate, and control the electronic plumbing system 10 (such as the electronic faucet 12) including the electronic valve 32, based on a position(s), movement(s), and/or motion(s) of an object in the activation zone. As used herein, an "object" can be any portion of a user's body or any item used by the user to trigger the activation sensor 38*a*. In exemplary embodiments, the activation zone extends generally outwardly from the activation sensor 38*a*. In the illustrated embodiments of FIGS. 3*a*-1-3*a*-3, 3*b*-1-3*b*-3, and 4*a*-4*c*, the activation zone extends generally outwardly from the spout 16 and/or from the wand 20 of the electronic faucet 12. More specifically, in the illustrated embodiments of FIGS. 3*a*-1-3*a*-3 and 3*b*-1-3*b*-3, the activation zone extends generally outwardly from the apex of the spout 16, from the front of the spout 16, and from the wand 20; and in the illustrated embodiments of FIGS. 4*a*-4*c*, the activation zone extends generally outwardly from the front of the spout 16. The activation sensor 38*a* will be described in greater detail below.

In the illustrated embodiments, as best shown in FIGS. 3*a*-1-3*a*-3, 3*b*-1-3*b*-3, and 5, the activation sensor/display assembly 38 includes an activation display 38*b*. In the illustrated embodiments, as best shown in FIGS. 3*a*-1-3*a*-3, 3*b*-1-3*b*-3, and 5, the electronic faucet 12 includes the activation display 38*b*. In exemplary embodiments, the activation display 38*b* is operable to be mounted on the electronic plumbing system 10, such as the electronic faucet 12. In the illustrated embodiments, as best shown in FIGS. 3*a*-1-3*a*-3, 3*b*-1-3*b*-3, and 5, the activation display 38*b* is mounted on the spout 16 and/or on the wand 20 of the electronic faucet 12. More specifically, in the illustrated embodiments of FIGS. 3*a*-1-3*a*-3 and 3*b*-1-3*b*-3, the activation display 38*b* is mounted on the apex of the spout 16, on the front of the spout 16, and on the wand 20; and in the illustrated embodiment of FIG. 5, the activation display 38*b* is mounted on the front of the spout 16. However, one of ordinary skill in the art will appreciate that the activation display 38*b* could be mounted in any one or more of these and/or other locations on and/or around the electronic plumbing system 10.

In exemplary embodiments, the activation display 38*b* is operable to convey to the user information regarding the activation, deactivation, and control of the electronic plumbing system 10 (such as the electronic faucet 12) including the electronic valve 32. In exemplary embodiments, the activation display 38*b* is operable to convey to the user other information (e.g., information regarding other devices in the vicinity of the electronic faucet 12, the time of day, or the weather). The activation display 38*b* will be described in greater detail below.

Although the activation sensor/display assembly 38 has been described as including both the activation sensor 38*a* and the activation display 38*b*, one of ordinary skill in the art will appreciate that the activation sensor/display assembly 38 could include just the activation sensor 38*a* or just the activation display 38*b*. Additionally, the activation sensor/display assembly 38 could include any number of the activation sensors 38*a* and any number of the activation displays 38*b*. Further, in exemplary embodiments, the activation sensor/display assembly 38, including the activation sensor(s) 38*a* and/or the activation display(s) 38*b*, may be combined in a single assembly or separated into a plurality of assemblies. In exemplary embodiments where the activation sensor/display assembly 38 is separated into a plurality of assemblies, each separate assembly could include the activation sensor(s) 38*a* and/or the activation display(s) 38*b*. For example, the activation sensor/display assembly 38 could include a first activation sensor 38*a* on the apex of the spout 16, a second activation sensor 38*a* on the front of the spout 16, and an activation display 38*b* on the wand 20. Alternatively, the activation sensor/display assembly 38 could include a first activation sensor 38*a* on a front of the hub 14, a second activation sensor 38*a* on the apex of the spout 16, and an activation display 38*b* on the front of the spout 16.

In the illustrated embodiments, the handle 22 operates as it would with a standard faucet. In other words, the handle 22 can be moved between various positions to indicate a desired temperature, flow rate, and/or volume of water discharged from the electronic faucet 12.

In the illustrated embodiments, as best shown in FIGS. 3*a*-1-3*a*-3, although the handle 22 does not control a mechanical valve, the handle 22 operates as it would with a standard faucet. In other words, the handle 22 can be moved between various positions to indicate a desired temperature, flow rate, and/or volume of water discharged from the electronic faucet 12.

More specifically, with regard to the temperature of water, the handle 22 can be rotated about a longitudinal axis of a side opening in the hub 14. At one extent of a range of rotation, the position of the handle 22 indicates all hot water (a full hot position). At the other extent of the range of rotation, the position of the handle 22 indicates all cold water (a full cold position). In between the extents of the range of rotation, the position of the handle 22 indicates a mix of hot and cold water (mixed temperature positions) with hotter temperature water as the position nears the full hot extent of the range of rotation and colder temperature water as the position nears the full cold extent of the range of rotation.

With regard to the flow rate/volume of water, the handle 22 can be moved toward and away from the side opening in the hub 14. At one extent of a range of movement, the position of the handle 22 indicates no flow rate/volume of water (a full closed position). At the other extent of the range of movement, the position of the handle 22 indicates full flow rate/volume of water (a full open position). In between the extents of the range of movement, the position of the handle 22 indicates an intermediate flow rate/volume of water (less than full open positions) with reduced flow rate/volume of water as the position nears the full closed extent of the range of movement and increased flow rate/volume of water as the position nears the full open extent of the range of movement.

In exemplary embodiments, the electronic faucet 12 is operable to detect movement of the handle 22 and to provide information to set at least one parameter for water flowing through the hot water electronic valve 32*h* and the cold water electronic valve 32*c* based on the movement of the handle 22. The electronic faucet 12 is operable to detect movement of the handle 22 either directly or indirectly. In exemplary embodiments, based on the movement of the handle 22, the electronic faucet 12 provides information to set a temperature, flow rate, and/or volume of water flowing through the hot water electronic valve 32*h* and the cold water electronic valve 32*c*.

Additionally, in the illustrated embodiments, as best shown in FIGS. 2*a* and 3*a*-1-3*a*-3, the electronic plumbing system 10 includes a parameter or position sensor 40. In the illustrated embodiments, as best shown in FIGS. 3*a*-1-3*a*-3, the electronic faucet 12 includes the parameter or position sensor 40. In exemplary embodiments, the parameter or position sensor 40 is operable to detect a handle state 22 (such as a position or a movement of the handle 22) and to provide information to set at least one parameter for water flowing through the hot water electronic valve 32*h* and the cold water electronic valve 32*c* based on the handle state 22 (such as the position or the movement of the handle 22). The parameter or position sensor 40 is operable to detect the handle state 22 (such as the position or the movement of the handle 22), ranging from the full hot position through the full cold position and from the full closed position through the full open position. The parameter or position sensor 40 is operable to detect the handle state 22 (such as the position or the movement of the handle 22) either directly or indirectly. In exemplary embodiments, based on the handle state 22 (such as the position or the movement of the handle 22), the parameter or position sensor 40 provides information to set a temperature, flow rate, and/or volume of water flowing through the hot water electronic valve 32*h* and the cold water electronic valve 32*c*.

An electronic plumbing system and, more particularly, an electronic faucet, including a parameter or position sensor that is operable to detect movement of a handle and to provide information to set at least one parameter (such as a temperature and/or a volume) of water flowing through a hot water electronic valve and a cold water electronic valve based on movement of the handle is disclosed in U.S. Pat. No. 9,212,473, assigned to FB Global Plumbing Group LLC, the entire disclosure of which is hereby incorporated by reference.

Further, in the illustrated embodiments, as best shown in FIGS. 2*a*-2*b*, 3*a*-1-3*a*-3, and 3*b*-1-3*b*-3, the electronic plumbing system 10 includes a control module 42, a user input/output module 44, and a power module 46.

The flow components of the control module 42 include a number of inlets and outlets and a number of flow passages. These inlets/outlets and flow passages enable the easy management of the flow between the incoming flows (i.e., the hot water line 26 and the cold water line 28) and the outgoing flow (i.e., the mixed water line 30 or the wand hose 18).

In the illustrated embodiments, as best shown in FIGS. 3*a*-1-3*a*-3 and 3*b*-1-3*b*-3, the control module 42 is operable to mount below the mounting surface M (such as the counter or sink). In exemplary embodiments, the control module 42 is operable to mount on a mounting shank of the electronic faucet 12. In the illustrated embodiments, the electronic valve 32 is located inside the control module 42. In the illustrated embodiments, the control module 42 includes a top or first side and a bottom or second side. The first side is opposite the second side. In the illustrated embodiments, the second side includes openings for hoses and flow passages. Although the control module 42 has been described as being mounted below the mounting surface M and the electronic valve 32 has been described as being located inside the control module 42, one of ordinary skill in the art will appreciate that, in certain embodiments, the control module 42 could be mounted in other locations and the electronic valve 32 may not be located inside the control module 42.

In the illustrated embodiments, as best shown in FIGS. 2*a*-2*b*, the control module 42 further includes a number of electronic components. These components control the operation of the electronic plumbing system 10 (such as the electronic faucet 12) including the electronic valve 32. More specifically, these components enable the activation, deactivation, and control of the electronic plumbing system 10 (such as the electronic faucet 12) including the electronic valve 32, through user input. In the illustrated embodiments, the control module 42 includes the electronic valve 32 and a printed circuit board ("PCB") 48. In the illustrated embodiments, a number of electronic components are mounted on the PCB 48, including, but not limited to, a processor 50, memory 52, a wireless communication chip or module 54, and a power port 56. The processor 50 is operable to receive signals from and send signals to the components of the electronic plumbing system 10 to control the operation of the electronic plumbing system 10 (such as the electronic faucet 12) including the electronic valve 32. In exemplary embodiments, the processor 50 is operable to communicate with each of the electronic valve 32 and the user input/output module 44 regarding a selected value of a parameter for water flowing through the discharge outlet 24. For example, the processor 50 is operable to receive signals from sensors, the user input/output module 44, and other components of the electronic plumbing system 10 (described above and to be described in greater detail below) and send signals to the electronic valve 32, the user input/output module 44, and other components of the electronic plumbing system 10 to activate, deactivate, and control the electronic plumbing system 10 (such as the electronic faucet 12) including the electronic valve 32. The memory 52 is operable to save information received from the components of the electronic plumbing system 10.

Additionally, in the illustrated embodiments, as best shown in FIGS. 2*a*-2*b*, the electronic plumbing system 10 includes a system provider cloud server 58 and a third party cloud server 60. The system provider cloud server 58 could be hosted by a system provider (such as an electronic plumbing system manufacturer), and the third party cloud server 60 could be hosted by a third party (such as Amazon, Google, HomeKit, and IFTTT). In the illustrated embodiments, as best shown in FIGS. 2*a*-2*b*, each of the system provider cloud server 58 and the third party cloud server 60 includes a processor 58*a*, 60*a* and memory 58*b*, 60*b*. The signals received from and sent to the components of the electronic plumbing system 10 to control the operation of the electronic plumbing system 10 can be received from and sent to the processor 58*a* in the system provider cloud server 58 and/or the processor 60*a* in the third party cloud server 60 in addition to or alternatively to the processor 50 in the control module 42. Similarly, the information received from the components of the electronic plumbing system 10 can be saved in the memory 58*b* in the system provider cloud server 58 and/or the memory 60*b* in the third party cloud server 60 in addition to or alternatively to the memory 52 in the control module 42. Further, the information received from the components of the electronic plumbing system 10 can be saved in the user input/output module 44 (where the user input/output module 44 includes memory, such as an Apple iPhone and a Google Android phone).

As used herein, unless stated otherwise, "processor" includes any one or more of the processor 50 in the control module 42, the processor 58*a* in the system provider cloud server 58, and the processor 60*a* in the third party cloud server 60. Similarly, as used herein, unless stated otherwise, "memory" includes any one or more of the memory 52 in the control module 42, the memory 58*b* in the system provider cloud server 58, the memory 60*b* in the third party cloud server 60, and the memory in the user input/output module 44.

In exemplary embodiments, the user input/output module 44 is operable to receive input (e.g., information and/or instructions) from the user, provide the input to the components of the electronic plumbing system 10 (e.g., the processor), receive output (e.g., information and/or notifications) from the components of the electronic plumbing system 10 (e.g., the processor), and display the output to the user. In exemplary embodiments, the user input/output module 44 is operable to receive input from the user and send signals to the processor to control the operation of the electronic plumbing system 10 (such as the electronic faucet 12) including the electronic valve 32. In exemplary embodiments, the user input/output module 44 is operable to communicate with the user regarding a selected value of a parameter for water flowing through the discharge outlet 24. For example, the user input/output module 44 is operable to receive input from the user and send signals to the processor to activate, deactivate, and control the electronic plumbing system 10 (such as the electronic faucet 12) including the electronic valve 32. Additionally, the user input/output module 44 is operable to receive signals from the processor and display output to the user. The user input/output module 44 can send signals to and receive signals from the processor directly and/or indirectly (e.g., through other components of the electronic plumbing system 10 and/or through other components outside of the electronic plumbing system 10).

The user input/output module 44 can include any device that enables input from the user and/or output to the user. The user input/output module 44 includes electronic input/output device(s) 62 and manual input device(s) 64. Exemplary electronic input/output devices 62 include activation sensor/display assemblies (including activation sensors and activation displays), mobile devices, voice controlled devices, touch screen devices, and push button devices. Exemplary manual input/output devices 64 include handles and joysticks.

In the illustrated embodiments of FIGS. 3*a*-1-3*a*-3, the user input/output module 44 includes three electronic input/output devices 62 and one manual input device 64, i.e., the activation sensor/display assembly 38 (including the activation sensor 38*a* and the activation display 38*b*) on the electronic faucet 12, a mobile device 66 that can be held and/or moved by the user, a voice controlled device 68 located on the mounting surface M that can be held and/or moved by the user, and the handle 22 connected to the hub 14 of the electronic faucet 12 located on the mounting surface M. In the illustrated embodiments of FIGS. 3*b*-1-3*b*-3, the user input/output module 44 includes three electronic input/output devices 62, i.e., the activation sensor/display assembly 38 (including the activation sensor 38*a* and the activation display 38*b*) on the electronic faucet 12, the mobile device 66 that can be held and/or moved by the user, and the voice controlled device 68 located on the mounting surface M that can be held and/or moved by the user. In the illustrated embodiments of FIGS. 3*b*-1-3*b*-3, the user input/output module 44 does not include any manual input device 64, i.e., the handle 22.

One of ordinary skill in the art will appreciate that the user input/output module 44 could include any number of devices, and each device of the user input/output module 44 could include any number of components. Moreover, one of ordinary skill in the art will appreciate that each device of the user input/output module 44 could be in any location where it can, at some point in time, send signals to and/or receive signals from other components of the electronic plumbing system 10 (e.g., the processor), or each device of the user input/output module 44 could be integrally formed with or physically connected to other components of the electronic plumbing system 10 (e.g., the control module 42). For example, the voice controlled device 68 could be integrated into the electronic faucet 12.

In the illustrated embodiments, as best shown in FIGS. 2*a*-2*b*, 3*a*-1-3*a*-3, and 3*b*-1-3*b*-3, the power module 46 is operable to provide power to the electrical/electronic components of the electronic plumbing system 10. In the illustrated embodiments, the power module 46 is operable to mount below the mounting surface M. In exemplary embodiments, the power module 46 includes battery power. In exemplary embodiments, the power module 46 includes AC power. Although the power module 46 has been described as being mounted below the mounting surface M, one of ordinary skill in the art will appreciate that, in certain embodiments, the power module 46 could be mounted in other locations.

Further, in the illustrated embodiments, the electronic plumbing system 10 includes sensors. In the illustrated embodiments, the sensors include the activation sensor 38*a*, the parameter or position sensor 40, a temperature sensor 74, a flow sensor 76, a pressure sensor 78, and a valve sensor 80. The activation sensor 38*a* and the parameter or position sensor 40 were described above. The temperature sensor 74 is operable to detect a temperature of water in the hot water line 26, the cold water line 28, the electronic valve 32, and/or the mixed water line 30 or wand hose 18. The flow sensor 76 is operable to detect a flow rate of water in the hot water line 26, the cold water line 28, the electronic valve 32, and/or the mixed water line 30 or wand hose 18. The pressure sensor 78 is operable to detect a pressure of water in the hot water line 26, the cold water line 28, the electronic valve 32, and/or the mixed water line 30 or wand hose 18. The valve sensor 80 is operable to detect a position of the electronic valve 32 and/or a motor driving the electronic valve 32. The sensors send signals to the processor indicating the detected information.

The information detected by the sensors is used to control the operation of the electronic plumbing system 10. For example, the information detected by the activation sensor 38*a* can be used to activate and deactivate the electronic plumbing system 10 and/or to determine a temperature, flow rate, volume, and/or other parameter(s) for water desired by the user. The information detected by the parameter or position sensor 40 can be used to determine a temperature, flow rate, and/or volume of water desired by the user. The information detected by the temperature sensor 74 can be used to maintain a temperature of water discharged from the electronic plumbing system 10. The information detected by the flow sensor 76 can be used to determine if there is flow or maintain a flow rate of water discharged from the electronic plumbing system 10. The information detected by the pressure sensor 78 can be used to maintain a pressure or determine a volume of water discharged from the electronic plumbing system 10. The information detected by the valve sensor 80 can be used to open and close the electronic valve 32.

Although the electronic plumbing system 10 has been described as including the activation sensor 38*a*, the parameter or position sensor 40, the temperature sensor 74, the flow sensor 76, the pressure sensor 78, and the valve sensor 80, one of ordinary skill in the art will appreciate that, in certain embodiments, the electronic plumbing system 10 could include other sensors or may not include all these sensors depending on which parameters for the water discharged from the electronic plumbing system 10 are desired to be controlled.

Additionally, in the illustrated embodiments, the electronic plumbing system 10 includes a clock/timer 82. The clock/timer 82 is operable to provide a date and a time of an action or to measure time intervals. For example, the clock/timer 82 can provide a date and a time of an activation, a deactivation, or a control of the electronic plumbing system 10 or measure a time interval between an activation, a deactivation, and a control of the electronic plumbing system 10. In exemplary embodiments, the processor includes an internal clock/timer. Any timing of actions or steps described herein could be provided by the clock/timer 82 or the internal clock/timer of the processor.

In exemplary embodiments, some components of the electronic plumbing system 10 are connected to each other via a wireless communication connection or network interface 70, while other components of the electronic plumbing system 10 are connected to each other via a wired communication connection or network interface 72. In exemplary embodiments, some components of the electronic plumbing system 10 are operable to send signals to and/or receive signals from each other via the wireless communication connection or network interface 70, while other components of the electronic plumbing system 10 are operable to send signals to and/or receive signals from each other via the wired communication connection or network interface 72.

One of ordinary skill in the art will appreciate that each component of the electronic plumbing system 10 could be connected to each other component of the electronic plumbing system 10 and send signals to and/or receive signals from each other component of the electronic plumbing system 10 via any one type or combination of different types of wireless communication connection(s) or network interface(s) 70 and/or wired communication connection(s) or network interface(s) 72. Further, one of ordinary skill in the art will appreciate that the wireless communication connection or network interface 70 and/or the wired communication connection or network interface 72 could be direct or indirect (e.g., via a router or a network hub). Moreover, one of ordinary skill in the art will appreciate that the wireless communication connection or network interface 70 could include any one type or any combination of different types of wireless communication connection(s) or network interface(s), including, but not limited to, Wi-Fi, Bluetooth, cellular, near field communication (NFC), Zigbee, and Z-Wave.

In the illustrated embodiments, as best shown in FIGS. 2*a*-2*b*, some components of the user input/output module 44 (e.g., the electronic input/output device(s) 62) are connected to other components of the electronic plumbing system 10 (e.g., the processor) via the wireless communication connection or network interface 70, while other components of the user input/output module 44 (e.g., the activation sensor/ display assembly 38 and the parameter or position sensor 40) are connected to other components of the electronic plumbing system 10 (e.g., the processor 50) via the wired communication connection or network interface 72. In the illustrated embodiments, as best shown in FIGS. 2*a*-2*b*, some components of the user input/output module 44 (e.g., the electronic input/output device(s) 62) are operable to send signals to and/or receive signals from other components of the electronic plumbing system 10 (e.g., the processor) via the wireless communication connection or network interface 70, while other components of the user input/output module 44 (e.g., the activation sensor/display assembly 38 and the parameter or position sensor 40) are operable to send signals to and/or receive signals from other components of the electronic plumbing system 10 (e.g., the processor 50) via the wired communication connection or network interface 72.

For example, in the illustrated embodiments, as best shown in FIGS. 3*a*-1 and 3*b*-1, the mobile device 66 and the voice controlled device 68 are connected to the control module 42 via the wireless communication connection or network interface 70. As stated above, this wireless communication connection or network interface 70 could be direct or indirect. In the illustrated embodiments, as best shown in FIGS. 3*a*-2 and 3*b*-2, the mobile device 66 and the voice controlled device 68 are connected to the control module 42 via the system provider cloud server 58 and/or the third party cloud server 60 (i.e., the wireless communication connection or network interface 70 is indirect). In the illustrated embodiments, as best shown in FIGS. 3*a*-3 and 3*b*-3, the mobile device 66 and the voice controlled device 68 are connected to the control module 42 via multiple different wireless communication connections or network interfaces 70 to provide redundancy in the event of a failure of one of the wireless communication connections or network interfaces 70. As stated above, each of these wireless communication connections or network interfaces 70 could be direct or indirect.

As stated above, one of ordinary skill in the art will appreciate that each component of the user input/output module 44 could be connected to each other component of the electronic plumbing system 10 (e.g., the processor) and send signals to and/or receive signals from each other component of the electronic plumbing system 10 (e.g., the processor) via any one type or combination of different types of wireless communication connection(s) or network interface(s) 70 and/or wired communication connection(s) or network interface(s) 72. Further, one of ordinary skill in the art will appreciate that the wireless communication connection or network interface 70 and/or the wired communication connection or network interface 72 could be direct or indirect (e.g., via a router or a network hub). Moreover, one of ordinary skill in the art will appreciate that the wireless communication connection or network interface 70 could include any one type or any combination of different types of wireless communication connection(s) or network interface(s), including, but not limited to, Wi-Fi, Bluetooth, cellular, near field communication (NFC), Zigbee, and Z-Wave.

In the illustrated embodiments, as best shown in FIGS. 2*a*-2*b*, 3*a*-2-3*a*-3, and 3*b*-2-3*b*-3, the system provider cloud server 58 and the third party cloud server 60 are connected to other components of the electronic plumbing system 10 (e.g., the processor 50) via the wireless communication connection or network interface 70. In the illustrated embodiments, as best shown in FIGS. 2*a*-2*b*, 3*a*-2-3*a*-3, and 3*b*-2-3*b*-3, the system provider cloud server 58 and the third party cloud server 60 are operable to send signals to and/or receive signals from other components of the electronic plumbing system 10 (e.g., the processor 50) via the wireless communication connection or network interface 70.

As stated above, one of ordinary skill in the art will appreciate that the system provider cloud server 58 and the third party cloud server 60 could be connected to other components of the electronic plumbing system 10 (e.g., the processor 50) and send signals to and/or receive signals from other components of the electronic plumbing system 10 (e.g., the processor 50) via any one type or combination of different types of wireless communication connection(s) or network interface(s) 70 and/or wired communication connection(s) or network interface(s) 72. Further, one of ordinary skill in the art will appreciate that the wireless communication connection or network interface 70 and/or the wired communication connection or network interface 72 could be direct or indirect (e.g., via a router or a network hub). Moreover, one of ordinary skill in the art will appreciate that the wireless communication connection or network interface 70 could include any one type or any combination of different types of wireless communication connection(s) or network interface(s), including, but not limited to, Wi-Fi, Bluetooth, cellular, near field communication (NFC), Zigbee, and Z-Wave.

In the illustrated embodiments, as best shown in FIGS. 2*a*-2*b*, 3*a*-1-3*a*-3, and 3*b*-1-3*b*-3, the sensors (such as the activation sensor 38*a*, the parameter or position sensor 40, the temperature sensor 74, the flow sensor 76, the pressure sensor 78, and the valve sensor 80) are connected to the control module 42 (and, thus, the processor 50) via the wired communication connection or network interface 72. In the illustrated embodiments, the sensors (such as the activation sensor 38*a*, the parameter or position sensor 40, the temperature sensor 74, the flow sensor 76, the pressure sensor 78, and the valve sensor 80) are operable to send signals to and/or receive signals from the control module 40 (and, thus, the processor 50) via the wired communication connection or network interface 72. Additionally, in the illustrated embodiments, as best shown in FIGS. 2a-2b, 3a-1-3a-3, and 3b-1-3b-3, the power module 46 is connected to the control module 42 via the wired communication connection or network interface 72.

As stated above, one of ordinary skill in the art will appreciate that the sensors (such as the activation sensor 38a, the parameter or position sensor 40, the temperature sensor 74, the flow sensor 76, the pressure sensor 78, and the valve sensor 80) and the power module 46 could be connected to the control module 42 and/or other components of the electronic plumbing system 10 (e.g., the processor) and send signals to and/or receive signals from the control module 42 and/or other components of the electronic plumbing system 10 (e.g., the processor) via any one type or combination of different types of wireless communication connection(s) or network interface(s) 70 and/or wired communication connection(s) or network interface(s) 72. Further, one of ordinary skill in the art will appreciate that the wireless communication connection or network interface 70 and/or the wired communication connection or network interface 72 could be direct or indirect (e.g., via a router or a network hub). Moreover, one of ordinary skill in the art will appreciate that the wireless communication connection or network interface 70 could include any one type or any combination of different types of wireless communication connection(s) or network interface(s), including, but not limited to, Wi-Fi, Bluetooth, cellular, near field communication (NFC), Zigbee, and Z-Wave.

During operation of the electronic plumbing system 10, the user activates, deactivates, and controls the electronic plumbing system 10 (such as the electronic faucet 12) including the electronic valve 32, using the user input/output module 44. When the user appropriately triggers the user input/output module 44, the electronic plumbing system 10 (such as the electronic faucet 12) including the electronic valve 32, is activated, deactivated, or controlled. For example, the user could trigger the user input/output module 44 by triggering the activation sensor 38a, pressing an appropriate button on the mobile device 66, stating specific commands to the voice controlled device 68, and/or opening, closing, and/or moving the handle 22. For voice control, when the user says "turn on the faucet," the electronic valve 32 is activated. Similarly, when the user says "turn off the faucet," the electronic valve 32 is deactivated. Further, when the user says "increase temperature," "decrease temperature," "increase flow," or "decrease flow," the electronic valve 32 is controlled to accomplish the requested action. The commands can be predetermined. Additionally, the commands can be customizable. For example, the user could activate the electronic valve 32 by saying "start flow" instead of "turn on the faucet." Similarly, the user could deactivate the electronic valve 32 by saying "stop flow" instead of "turn off the faucet."

As used herein, "activate a valve" means to move the valve to or maintain the valve in an open position, regardless of the volume, temperature, or other parameter(s) for the flowing water, and "deactivate a valve" means to move the valve to a completely closed position.

When reference is made to activating or deactivating the electronic valve 32 "when the user appropriately triggers the user input/output module 44," the electronic valve 32 may be activated or deactivated immediately upon the user input/output module 44 being triggered or a predetermined period of time after the user input/output module 44 has been triggered.

In exemplary embodiments, as best shown in FIGS. 2a-2b, 3a-1-3a-3, and 3b-1-3b-3, during operation of the electronic plumbing system 10 (such as the electronic faucet 12) including the electronic valve 32, using the activation sensor/display assembly 38, the user enters input via the activation sensor 38a (e.g., the user triggers the activation sensor 38a). The activation sensor 38a detects the input from the user and sends a signal to the processor 50 in the control module 42 via the wired communication connection or network interface 72. The processor 50 in the control module 42 receives the signal from the activation sensor 38a and sends a signal to the electronic valve 32 via the wired communication connection or network interface 72. The electronic valve 32 receives the signal from the processor 50 in the control module 42 and appropriately activates, deactivates, or controls other parameter(s) for the water delivered through the discharge outlet 24 of the electronic plumbing system 10 (such as the electronic faucet 12).

In exemplary embodiments, as best shown in FIGS. 2a-2b, 3a-1-3a-3, and 3b-1-3b-3, during operation of the electronic plumbing system 10 (such as the electronic faucet 12) including the electronic valve 32, using the mobile device 66, the user enters input via the mobile device 66 (e.g., the user presses a button on the mobile device 66). The mobile device 66 receives the input from the user and sends a signal to the processor 58a in the system provider cloud server 58 via the wireless communication connection or network interface 70. The processor 58a in the system provider cloud server 58 receives the signal from the mobile device 66 and sends a signal to the processor 50 in the control module 42 via the wireless communication or network interface 70. The processor 50 in the control module 42 receives the signal from the processor 58a in the system provider cloud server 58 and sends a signal to the electronic valve 32 via the wired communication connection or network interface 72. The electronic valve 32 receives the signal from the processor 50 in the control module 42 and appropriately activates, deactivates, or controls other parameter(s) for the water delivered through the discharge outlet 24 of the electronic plumbing system 10 (such as the electronic faucet 12).

In exemplary embodiments, as best shown in FIGS. 2a-2b, 3a-1-3a-3, and 3b-1-3b-3, during operation of the electronic plumbing system 10 (such as the electronic faucet 12) including the electronic valve 32, using the voice controlled device 68, the user enters input via the voice controlled device 68 (e.g., the user states a command to the voice controlled device 68). The voice controlled device 68 receives the input from the user and sends a signal to the processor 60a in the third party cloud server 60 via the wireless communication connection or network interface 70. The processor 60a in the third party cloud server 60 receives the signal from the voice controlled device 68 and sends a signal to the processor 58a in the system provider cloud server 58 via the wireless communication connection or network interface 70. The processor 58a in the system provider cloud server 58 receives the signal from the processor 60a in the third party cloud server 60 and sends a signal to the processor 50 in the control module 42 via the wireless communication connection or network interface 70. The processor 50 in the control module 42 receives the signal from the processor 58a in the system provider cloud server 58 and sends a signal to the electronic valve 32 via the wired communication connection or network interface 72.

The electronic valve 32 receives the signal from the processor 50 in the control module 42 and appropriately activates, deactivates, or controls other parameter(s) for the water delivered through the discharge outlet 24 of the electronic plumbing system 10 (such as the electronic faucet 12).

In exemplary embodiments, as best shown in FIGS. 2a and 3a-1-3a-3, during operation of the electronic plumbing system 10 (such as the electronic faucet 12) including the electronic valve 32, using the handle 22, the user enters input via the handle 22 (e.g., the user moves the handle 22). The parameter or position sensor 40 detects the handle state 22 (such as the position or the movement of the handle 22 by the user) and sends a signal to the processor 50 in the control module 42 via the wired communication connection or network interface 72. The processor 50 in the control module 42 receives the signal from the parameter or position sensor 40 and sends a signal to the electronic valve 32 via the wired communication connection or network interface 72. The electronic valve 32 receives the signal from the processor 50 in the control module 42 and appropriately activates, deactivates, or controls other parameter(s) for the water delivered through the discharge outlet 24 of the electronic plumbing system 10 (such as the electronic faucet 12).

In exemplary embodiments, as best shown in FIGS. 2a-2b, 3a-1-3a-3, and 3b-1-3b-3, during operation of the electronic plumbing system 10 (such as the electronic faucet 12) including the electronic valve 32, using the activation sensor/display assembly 38, the user receives output via the activation display 38b (e.g., the user receives information on the activation display 38b). The sensor(s) detect information regarding parameter(s) for the water delivered through the discharge outlet 24 of the electronic plumbing system 10, (such as the electronic faucet 12) and send signal(s) to the processor 50 in the control module 42 via the wired communication connection or network interface 72. The processor 50 in the control modules 42 receives the signal(s) from the sensor(s) and sends a signal to the activation display 38b via the wired communication connection or network interface 72. The activation display 38b receives the signal from the processor 50 in the control module 42 and conveys to the user the information regarding parameter(s) for the water (e.g., displays to the user the information).

In exemplary embodiments, as best shown in FIGS. 2a-2b, 3a-1-3a-3, and 3b-1-3b-3, during operation of the electronic plumbing system 10 (such as the electronic faucet 12) including the electronic valve 32, using the mobile device 66, the user receives output via the mobile device 66 (e.g., the user receives information on the mobile device 66). The sensor(s) detect information regarding parameter(s) for the water delivered through the discharge outlet 24 of the electronic plumbing system 10 and send signal(s) to the processor 50 in the control module 42 via the wired communication connection or network interface 72. The processor 50 in the control modules 42 receives the signal(s) from the sensor(s) and sends a signal to the processor 58a in the system provider cloud server 58 via the wireless communication connection or network interface 70. The processor 58a in the system provider cloud server 58 receives the signal from the processor 50 in the control module 42 and sends a signal to the mobile device 66 via the wireless communication connection or network interface 70. The mobile device 66 receives the signal from the processor 58a in the system provider cloud server 58 and conveys to the user the information regarding parameter(s) for the water (e.g., displays to the user the information).

In exemplary embodiments, as best shown in FIGS. 2a-2b, 3a-1-3a-3, and 3b-1-3b-3, during operation of the electronic plumbing system 10 (such as the electronic faucet 12) including the electronic valve 32, using the voice controlled device 68, the user receives output via the voice controlled device 68 (e.g., the user receives information from the voice controlled device 68). The sensor(s) detect information regarding parameter(s) for the water delivered through the discharge outlet 24 of the electronic plumbing system 10 and send signal(s) to the processor 50 in the control module 42 via the wired communication connection or network interface 72. The processor 50 in the control module 42 receives the signal(s) from the sensor(s) and sends a signal to the processor 58a in the system provider cloud server 58 via the wireless communication connection or network interface 70. The processor 58a in the system provider cloud server 58 receives the signal from the processor 50 in the control module 42 and sends a signal to the processor 60a in the third party cloud server 60 via the wireless communication connection or network interface 70. The processor 60a in the system provider cloud server 60 receives the signal from the processor 58a in the system provider cloud server 58 and sends a signal to the voice controlled device 68 via the wireless communication connection or network interface 70. The voice controlled device 68 receives the signal from the processor 60a in the third party cloud server 60 and conveys to the user the information regarding parameter(s) for the water (e.g., speaks to the user the information).

Spatial Tracking and Feedback

In exemplary embodiments, the electronic plumbing system 10 includes spatial tracking and feedback.

In exemplary embodiments, the user input/output module 44 includes a mechanism (e.g., the activation sensor/display assembly 38 and, more specifically, the activation sensor 38a) to receive from the user selected value(s) of parameter(s) for the water delivered through the discharge outlet 24 of the electronic plumbing system 10 and a mechanism to deliver to the user the selected value(s) of the parameter(s) via the water delivered through the discharge outlet 24 of the electronic plumbing system 10. Exemplary parameters include a system state (e.g., active, hold, or inactive—to be described below), a valve state (e.g., open or closed), a temperature, a flow rate, a volume, a spray pattern, a droplet size, a pulsation, and a duration. Additionally, in exemplary embodiments, the user input/output module 44 includes a mechanism (e.g., the activation sensor/display assembly 38 and, more specifically, the activation display 38b) to display to the user information regarding value(s) of parameter(s) for the water delivered through the discharge outlet 24 of the electronic plumbing system 10. Exemplary information includes an indication of current value(s) of the parameter(s) for the water delivered through the discharge outlet 24 of the electronic plumbing system 10 and an indication of the selected value(s) of the parameter(s) for the water delivered through the discharge outlet 24 of the electronic plumbing system 10.

As stated above, in exemplary embodiments, the user input/output module 44 includes the activation sensor/display assembly 38 and, more specifically, the activation sensor 38a. In exemplary embodiments, the activation sensor/display assembly 38 includes a single activation sensor 38a. In exemplary embodiments, the activation sensor/display assembly 38 includes a plurality of activation sensors 38a. In exemplary embodiments including the plurality of activation sensors 38a, the activation sensors 38a are in a single location. In exemplary embodiments including the plurality of activation sensors 38*a*, the activations sensors 38*a* are in a plurality of locations. Exemplary locations for the activation sensor(s) 38*a* are illustrated in FIGS. 3*a*-1-3*a*-3, 3*b*-1-3*b*-3, and 4*a*-4*c*. In exemplary embodiments, the activation sensor/display assembly 38, and more specifically, the activation sensor(s) 38*a*, is operable to be mounted on the body.

Additionally, as stated above, the activation sensor 38*a* defines the activation zone. In exemplary embodiments, the activation sensor 38*a* is operable to detect positions, movements, and/or motions of the object in the activation zone. In exemplary embodiments, each position, movement, and/or motion of the object in the activation zone corresponds to value(s) of parameter(s) for the water delivered through the discharge outlet 24 of the electronic plumbing system 10. As the object (e.g., a hand) moves in the activation zone, the activation sensor 38 detects the position(s), movement(s), and/or motion(s) of the object in the activation zone, and the selected value(s) of the parameter(s) for the water delivered through the discharge outlet 24 of the electronic plumbing system 10 are set to the value(s) corresponding to the detected position(s), movement(s), and/or motion(s) of the object in the activation zone. Thus, each discrete position, movement, and/or motion of the object in the activation zone corresponds to discrete value(s) of parameter(s) for the water.

Figure 4A:
FIGS. 4*a*-4*c* are illustrations of components of electronic plumbing systems, including activation sensors of activation sensor/display assemblies mounted on electronic faucets, according to exemplary embodiments of the present invention
Figure 4B:
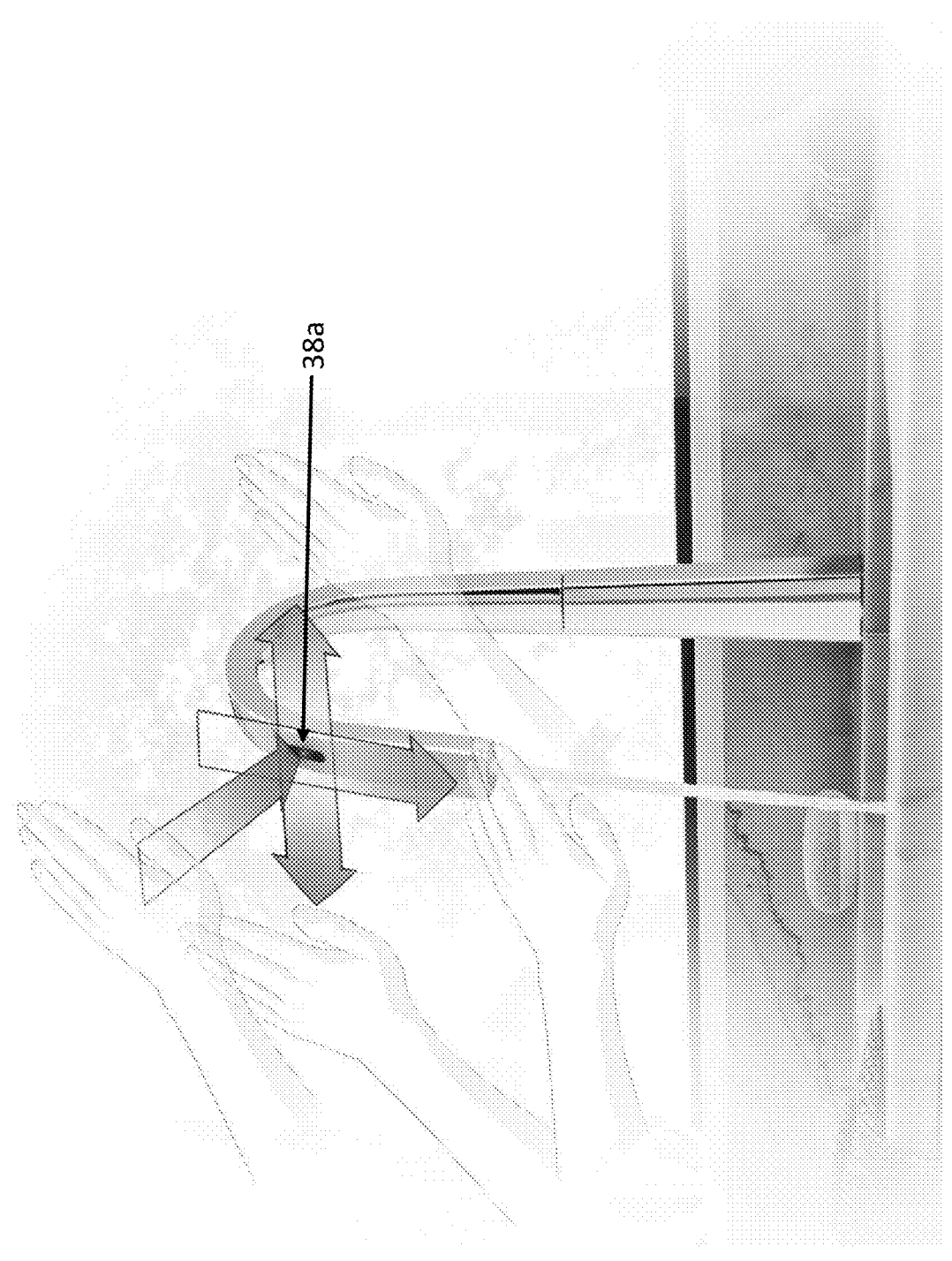
Figure 4C:
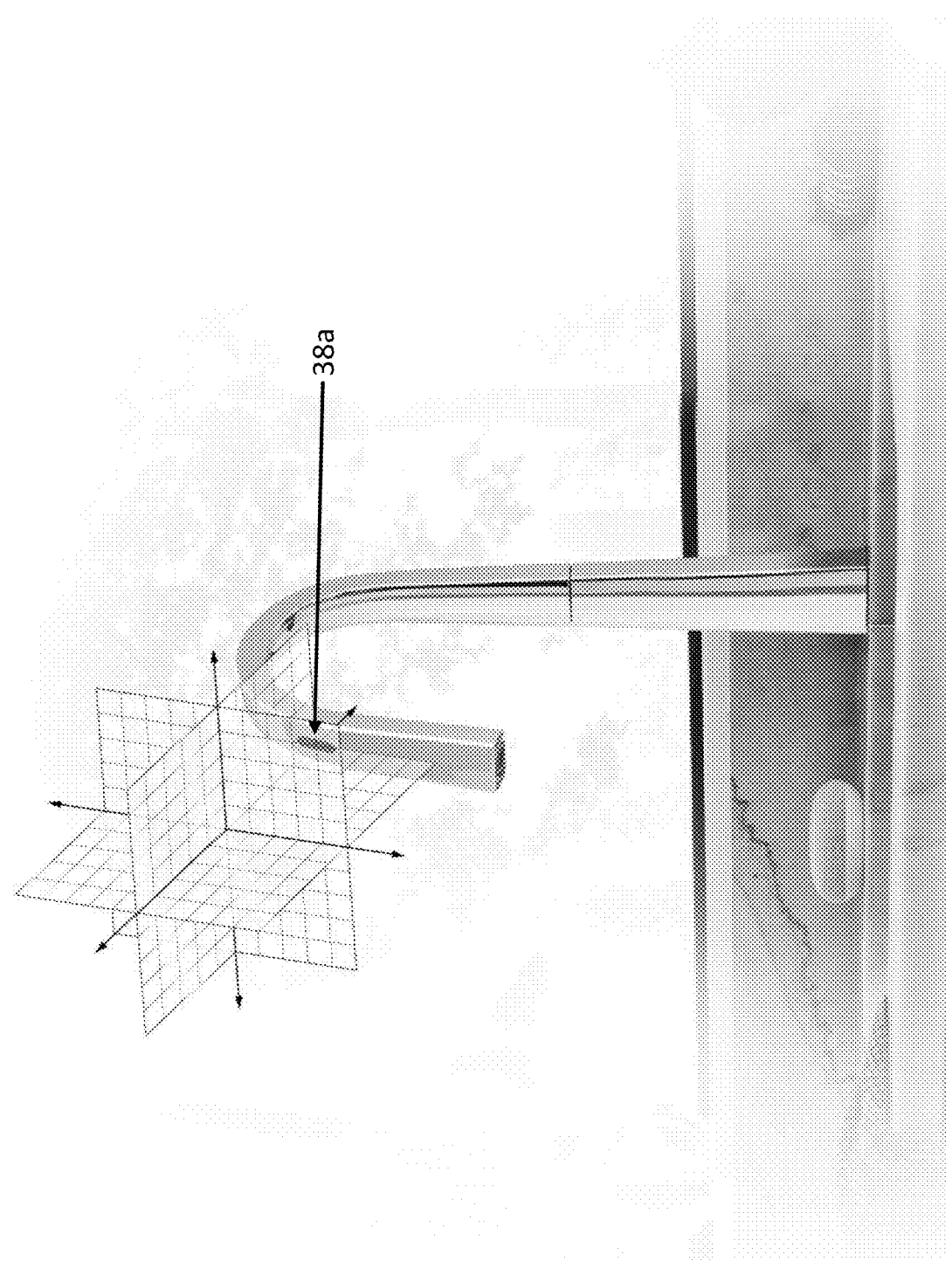
Figure 5:
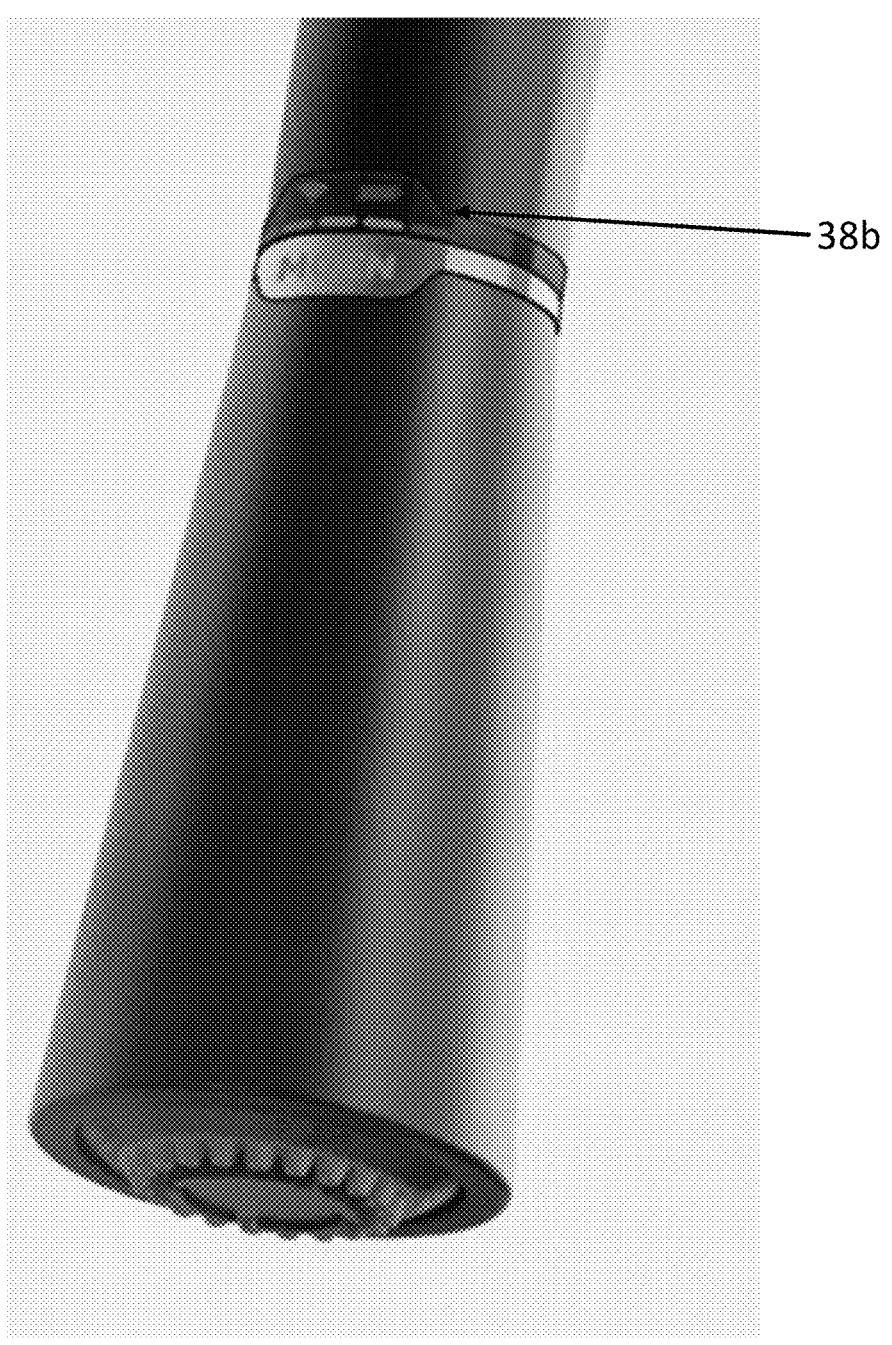
FIG. 5 is an illustration of components of an electronic plumbing system, including an activation display of an activation sensor/display assembly mounted on an electronic faucet, according to an exemplary embodiment of the present invention

In the illustrated embodiments, as best shown in FIGS. 4*b*-4*c*, the activation zone is a three-dimensional space, and the position, movement, and/or motion of the object relates to X, Y, and Z coordinates of the object in the activation zone. Each coordinate of the object in the activation zone corresponds to a parameter for water delivered through the discharge outlet 24 of the electronic plumbing system 10. In exemplary embodiments, the X coordinate of the object in the activation zone corresponds to the temperature of the water, the Y coordinate of the object in the activation zone corresponds to the flow rate of the water, and the Z coordinate of the object in the activation zone corresponds to the spray pattern of the water. In exemplary embodiments, the three-dimensional space of the activation zone is a cube, where a length of each edge of the cube is approximately 12 inches. However, one of ordinary skill in the art will appreciate that the activation zone could have one, two, or three dimensions (FIG. 4*a* shows a two-dimensional activation zone), each dimension of the activation zone could correspond to any parameter(s) for the water, the activation zone could have any shape, and the activation zone could have any size.

In exemplary embodiments, the activation zone has at least one dimension, and each dimension of the activation zone corresponds to one parameter for water. In exemplary embodiments, the activation zone has a plurality of dimensions, and each dimension of the activation zone corresponds to one of a plurality of parameters for water.

In exemplary embodiments, the electronic plumbing system 10 has an active system state, a hold system state, and an inactive system state. In the active system state, water is being delivered through the discharge outlet 24 of the electronic plumbing system 10, and the position, movement, and/or motion of the object in the activation zone is determining the selected value(s) of the parameter(s) for the water. In the hold system state, water is being delivered through the discharge outlet 24 of the electronic plumbing system 10, but the position, movement, and/or motion of the object in the activation zone is not determining the selected value(s) of the parameter(s) for the water. In the inactive system state, water is not being delivered through the discharge outlet 24 of the electronic plumbing system 10.

Figure 6:
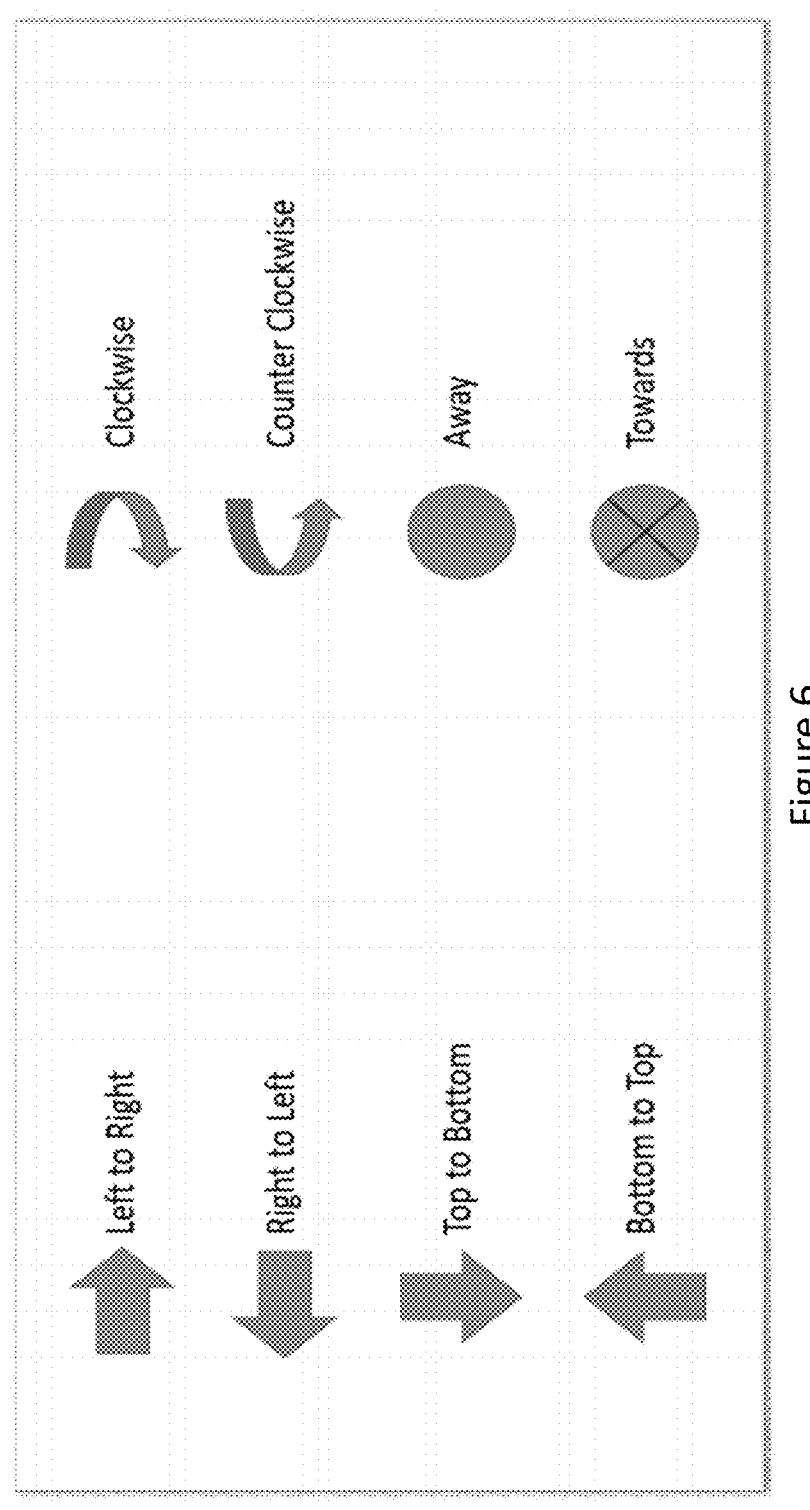
FIG. 6 is a schematic illustration of movements and motions detected by an activation sensor of an electronic plumbing system according to an exemplary embodiment of the present invention.

In exemplary embodiments, the electronic plumbing system 10 is operable to enter the active system state when the electronic plumbing system 10 is in the inactive system state or the hold system state and detects an activation sequence. In exemplary embodiments, the activation sequence includes a first predetermined position(s), movement(s), and/or motion(s) of the object in the activation zone. For example, in an exemplary embodiment, the activation sequence includes the object entering the activation zone, moving to any position, and staying in that position for a first predetermined period of time. Alternatively, in an exemplary embodiment, the activation sequence includes the object moving from a first predetermined beginning position to a first predetermined ending position in the activation zone. Further alternatively, in an exemplary embodiment, the activation sequence includes the object making a first predetermined motion (e.g., any of the motions shown in FIG. 6, waving a hand, raising a single finger, raising multiple fingers, or making a fist) in the activation zone. In the active system state, the selected value(s) of the parameter(s) for the water delivered through the discharge outlet 24 of the electronic plumbing system 10 are set to the value(s) corresponding to the detected position, movement, and/or motion of the object in the activation zone.

In exemplary embodiments, the electronic plumbing system 10 is operable to enter the hold system state when the electronic plumbing system 10 is in the active system state and detects a hold sequence. In exemplary embodiments, the hold sequence includes a second predetermined position(s), movement(s), and/or motion(s) of the object in the activation zone. For example, in an exemplary embodiment, the hold sequence includes the object moving to any position and staying in that position for a second predetermined period of time. Alternatively, in an exemplary embodiment, the hold sequence includes the object moving from a second predetermined beginning position to a second predetermined ending position in the activation zone. Further alternatively, in an exemplary embodiment, the hold sequence includes the object making a second predetermined motion (e.g., any of the motions shown in FIG. 6, waving a hand, raising a single finger, raising multiple fingers, or making a fist) in the activation zone. In the hold system state, the selected value(s) of the parameter(s) for the water delivered through the discharge outlet 24 of the electronic plumbing system 10 are still set to the value(s) corresponding to the last detected position, movement, and/or motion of the object in the activation zone in the active system state prior to entering the hold system state.

In exemplary embodiments, the electronic plumbing system 10 is operable to enter the inactive system state when the electronic plumbing system 10 is in the active system state or the hold system state and detects a deactivation sequence. In exemplary embodiments, the deactivation sequence includes a third predetermined position(s), movement(s), and/or motion(s) of the object in the activation zone. For example, in an exemplary embodiment, the deactivation sequence includes the object moving to any position and staying in that position for a third predetermined period of time. Alternatively, in an exemplary embodiment, the deactivation sequence includes the object moving from a third predetermined beginning position to a third predetermined ending position in the activation zone. Further alternatively, in an exemplary embodiment, the deactivation sequence includes the object making a third predetermined motion (e.g., any of the motions shown in FIG. 6, waving a hand, raising a single finger, raising multiple fingers, or making a fist) in the activation zone. In the inactive system state, water is not being delivered through the discharge outlet 24 of the electronic plumbing system 10.

Exemplary embodiments of the activation sequence, the hold sequence, and the deactivation sequence have been described above as including specific position(s), movement(s), and/or motion(s) of the object in the activation zone. However, one of ordinary skill in the art will appreciate that other exemplary embodiments of the activation sequence, the hold sequence, and the deactivation sequence could include other position(s), movement(s), and/or motion(s) of the object in the activation zone.

In exemplary embodiments, the object needs to exit and reenter the activation zone to move from the hold system state to the active system state. Similarly, in exemplary embodiments, the object needs to exit and reenter the activation zone to move from the inactive system state to the active system state. However, one of ordinary skill in the art will appreciate that, in other exemplary embodiments, the object does not need to exit and reenter the activation zone to move between the active system state, the hold system state, and the inactive system state.

In exemplary embodiments, the first predetermined period of time and the second predetermined period of time are the same. In exemplary embodiments, the first predetermined period of time and the second predetermined period of time are in the range of approximately 0.1 second to 1.0 second. In exemplary embodiments, the first predetermined period of time and the second predetermined period of time are in the range of approximately 0.25 second to 0.5 second. In exemplary embodiments, the first predetermined period of time and the second predetermined period of time are different.

In exemplary embodiments, the third predetermined period of time is different than the first predetermined period of time and the second predetermined period of time. In exemplary embodiments, the third predetermined period of time is longer than the first predetermined period of time and the second predetermined period of time.

In exemplary embodiments, the activation zone includes a plurality of activation subzones. In exemplary embodiments, the activation sensor 38a is operable to detect positions, movements, and/or motions of the object in the activation subzones. In exemplary embodiments, position(s), movement(s), and/or motion(s) in each activation subzone correspond to value(s) of parameter(s) for the water delivered through the discharge outlet 24 of the electronic plumbing system 10. In exemplary embodiments, each activation subzone includes a plurality of positions, movements, and/or motions in the activation subzone. As the object (e.g., the hand) moves in the activation subzones, the activation sensor 38 detects position(s), movement(s), and/or motion(s) of the object in the activation subzones, and the selected value(s) of the parameter(s) for the water delivered through the discharge outlet 24 of the electronic plumbing system 10 are set to the value(s) corresponding to the detected position(s), movement(s), and/or motion(s) of the object in the activation subzone. Thus, position(s), movement(s), and/or motion(s) in each discrete activation subzone correspond to discrete value(s) of parameter(s) for the water.

In exemplary embodiments, when the electronic plumbing system 10 is in the active system state, water is being delivered through the discharge outlet 24 of the electronic plumbing system 10, and the position, movement, and/or motion of the object in the activation subzones is determining the selected value(s) of the parameter(s) for the water. When the electronic plumbing system 10 is in the hold system state, water is being delivered through the discharge outlet 24 of the electronic plumbing system 10, but the position, movement, and/or motion of the object in the activation subzones is not determining the selected value(s) of the parameter(s) for the water. When the electronic plumbing system 10 is in the inactive system state, water is not being delivered through the discharge outlet 24 of the electronic plumbing system 10.

Figure 7:
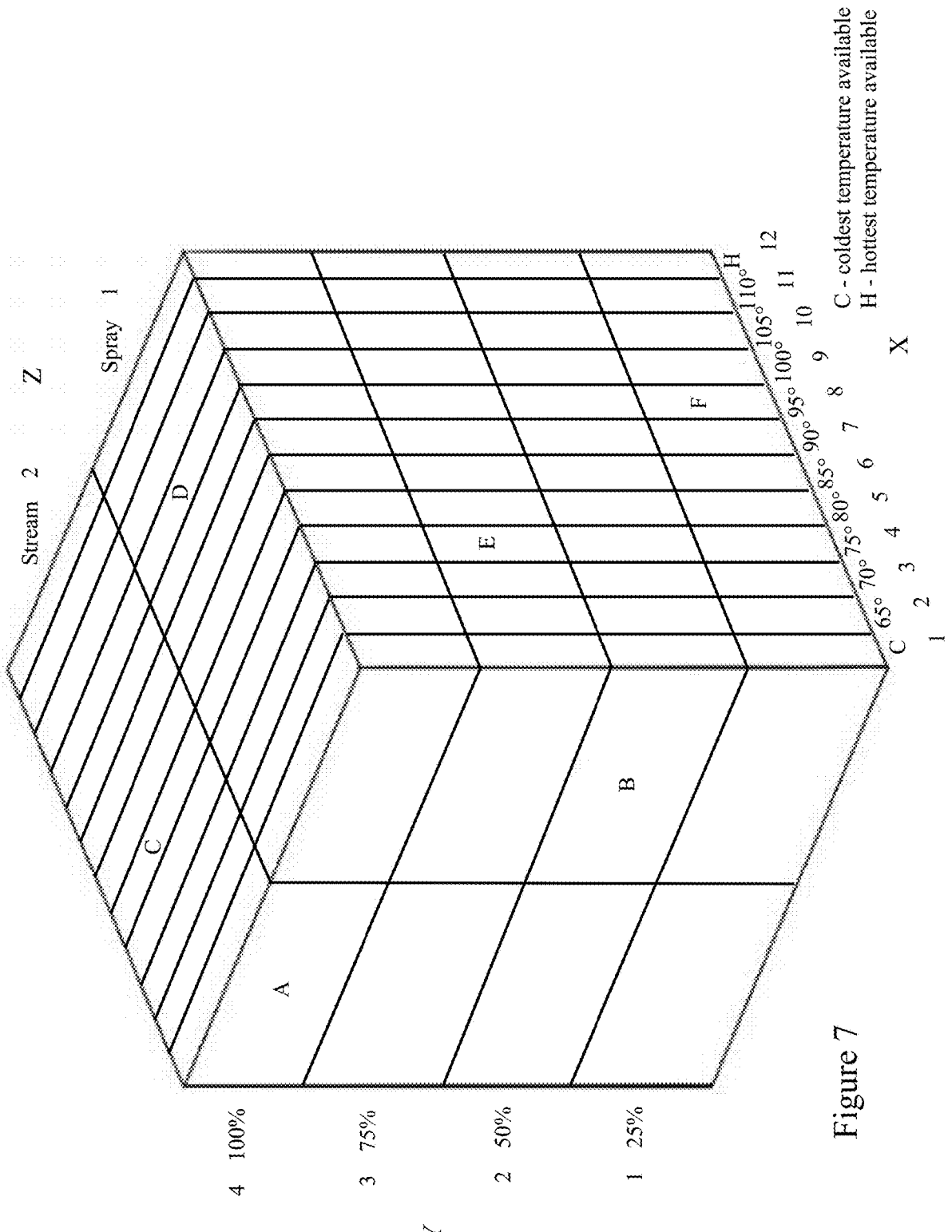
FIG. 7 is a schematic illustration of a three-dimensional activation zone, including activation subzones, according to an exemplary embodiment of the present invention.

In the illustrated embodiments, as best shown in FIGS. 7-10, the activation zone is a cube with approximately 12-inch edges, each activation subzone is a rectangular prism with a X dimension (i.e., length) of approximately 1 inch, a Y dimension (i.e., height) of approximately 3 inches, and a Z dimension (i.e., width) of approximately 6 inches. In this exemplary embodiment, where the X coordinate of the object in the activation zone corresponds to the temperature of the water and there are 12 temperature activation subzones, each activation subzone corresponds to a temperature ranging from coldest temperature available to 65° F. through 110° F. to hottest temperature available, with a 5° F. change in temperature between adjacent subzones from 65° F. to 110° F., as best shown in FIGS. 7 and 8. In this exemplary embodiment, where the Y coordinate of the object in the activation zone corresponds to the flow rate of the water and there are 4 flow rate activation subzones, each activation subzone corresponds to a flow rate ranging from 25% to 100%, with a 25% change in flow rate between adjacent subzones, as best shown in FIGS. 7 and 9. In this exemplary embodiment, where the Z coordinate of the object in the activation zone corresponds to the spray pattern of the water and there are 2 spray pattern activation subzones, each activation subzone corresponds to a spray pattern (e.g., spray and stream), as best shown in FIGS. 7 and 10. However, one of ordinary skill in the art will appreciate that the activation subzones could have one, two, or three dimensions, each dimension of the activation subzones could correspond to any parameter(s) for the water, the activation subzones could have any shape, and the activation subzones could have any size (FIG. 4c shows an activation zone that is a cube and activation subzones that are cubes with equal X, Y, and Z dimensions).

In exemplary embodiments, the activation subzone has at least one dimension, and each dimension of the activation subzone corresponds to one parameter for water. In exemplary embodiments, the activation subzone has a plurality of dimensions, and each dimension of the activation subzone corresponds to one of a plurality of parameters for water.

In the exemplary embodiment shown in FIG. 7, the selected values of the parameters (i.e., the temperature, the flow rate, and the spray pattern) for the water delivered through the discharge outlet 24 of the electronic plumbing system 10 are set to the following values when the detected position of the object is in the activation subzones designated by A, B, C, D, E, and F, respectively:

1. Activation Subzone A—temperature—coldest temperature available; flow rate—100%; spray pattern—stream;
2. Activation Subzone B—temperature—coldest temperature available; flow rate—50%; spray pattern—spray;
3. Activation Subzone C—temperature—80° F.; flow rate—100%; spray pattern—stream;
4. Activation Subzone D—temperature—100° F.; flow rate—100%; spray pattern—spray;
5. Activation Subzone E—temperature—75° F.; flow rate—75%; spray pattern—spray; and 6. Activation Subzone F—temperature—95° F.; flow rate—25%; spray pattern—spray.

In exemplary embodiments, each position, movement, and/or motion of the object in the activation zone corresponds to value(s) of parameter(s) for the water delivered through the discharge outlet 24 of the electronic plumbing system 10. In exemplary embodiments, each activation subzone (including a plurality of positions, movements, and/or motions) in the activation zone corresponds to value(s) of parameter(s) for the water delivered through the discharge outlet 24 of the electronic plumbing system 10. In exemplary embodiments, each position, movement, and/or motion or each activation subzone (including a plurality of positions, movements, and/or motions) and the corresponding value(s) of the parameter(s) for the water are stored in a lookup table or similar data structure.

In exemplary embodiments, the data in the lookup table (i.e., the positions, movements, and/or motions or activation subzones and the corresponding values of the parameters for the water) are predetermined and stored by the system provider (such as the electronic plumbing system manufacturer). In exemplary embodiments, the data in the lookup table (i.e., the positions, movements, and/or motions or activation subzones and the corresponding values of the parameters for the water) are customizable and updatable by the user. In exemplary embodiments, the values of the parameters for the water corresponding to the positions, movements, and/or motions or activation subzones are customizable and updatable by the user. For example, instead of the 4 flow rate activation subzones corresponding to a flow rate ranging from 25% to 100%, with a 25% change in flow rate between adjacent subzones, the user could specify that the 4 flow rate activation subzones correspond to flow rates of 10%, 25%, 50%, and 100%. In exemplary embodiments, the parameters for the water corresponding to the positions, movements, and/or motions or activation subzones are customizable and updatable by the user. For example, instead of the X and Y coordinates of the object in the activation zone corresponding to the temperature and the flow rate of the water, respectively, the user could specify that the X and Y coordinates of the object in the activation zone correspond to the flow rate and the temperature of the water, respectively.

In exemplary embodiments, the value of the parameter in one dimension increases in one direction and decreases in the opposite direction. Additionally, in exemplary embodiments, the value of the parameter in one dimension (from one position, movement, and/or motion or activation subzone to the next position, movement, and/or motion or activation subzone) increases or decreases at a linear rate along the dimension. Alternatively, in exemplary embodiments, the value of the parameter in one dimension (from one position, movement, and/or motion or activation subzone to the next position, movement, and/or motion or activation subzone) increases or decreases at a non-linear rate along the dimension.

In exemplary embodiments, the value of the parameter in one dimension (from one position, movement, and/or motion or activation subzone to the next position, movement, and/or motion or activation subzone) is binary and toggles between two values (e.g., open and closed for the valve state; spray and stream for the spray pattern). In exemplary embodiments, the value of the parameter in one dimension (from one position, movement, and/or motion or activation subzone to the next position, movement, and/or motion or activation subzone) is plural and cycles between a plurality of values (e.g., active, hold, and inactive for the system state; first spray, second spray, and stream for the spray pattern).

In exemplary embodiments, the temperature of the water may vary from a highest achievable temperature (e.g., 120° F.) to a lowest achievable temperature (e.g., 50° F.). In exemplary embodiments, the flow rate may vary from a full flow rate (i.e., 100% flow) to a minimal flow rate (e.g., 10% flow). In exemplary embodiments, the spray pattern may vary from stream to spray. However, one of ordinary skill in the art will appreciate that the values of the parameters for the water may have any range.

In exemplary embodiments, the temperature of the water may be varied at defined intervals (e.g., 5° F. increments or 5° F. decrements). In exemplary embodiments, the flow rate may be varied at defined intervals (e.g., 25% increments or 25% decrements). In exemplary embodiments, the spray pattern may be toggled between stream and spray. However, one of ordinary skill in the art will appreciate that the values of the parameters for the water may be varied at any interval.

In exemplary embodiments, the activation sensor 38a includes an emitter and a plurality of detectors. In exemplary embodiments, the activation sensor 38a includes a plurality of emitters and a plurality of detectors. Each emitter is operable to emit energy (e.g., light or sound). Each detector is operable to detect the emitted energy. In exemplary embodiments, the activation sensor 38a is a proximity sensor. Proximity sensors are sensors that detect the presence of an object without any physical contact. In exemplary embodiments, the activation sensor 38a is an infrared (IR) sensor. However, one of ordinary skill in the art will appreciate that the activation sensor 38a could be any type of electronic sensor that can detect position(s), movement(s), and/or motion(s) of an object. Other exemplary sensors include, but are not limited to, radio frequency (RF) sensors, lidar sensors, radar sensors, time of flight (TOF) sensors, optical sensors, camera sensors, and capacitive sensors. In exemplary embodiments, the activation sensor 38a is a PAJ7620U2 integrated gesture recognition sensor, sold by PixArt Imaging Inc., as described in the PAJ7620U2 General Datasheet, version 1.0, dated Mar. 29, 2016, document number 41002AEN, and available for download at https://www.pixart.com/products-detail/37/PAJ7620U2.

As stated above, in exemplary embodiments, the user input/output module 44 includes the activation sensor/display assembly 38 and, more specifically, the activation display 38b. In exemplary embodiments, the activation sensor/display assembly 38 includes a single activation display 38b. In exemplary embodiments, the activation sensor/display assembly 38 includes a plurality of activation displays 38b. In exemplary embodiments including the plurality of activation displays 38b, the activation displays 38b are in a single location. In exemplary embodiments including the plurality of activation displays 38b, the activation displays 38b are in a plurality of locations. Exemplary locations for the activation display(s) 38b are illustrated in FIGS. 3a-1-3a-3, 3b-1-3b-3, and 5.

Additionally, as stated above, in exemplary embodiments, the activation display 38b is operable to convey to the user information regarding the value(s) of the parameter(s) for the water delivered through the discharge outlet 24 of the electronic plumbing system 10.

In exemplary embodiments, the activation display 38b is operable to convey to the user information regarding at least one of the following:

1. the current value(s) of at least one of the parameter(s) for the water delivered through the discharge outlet 24 of the electronic plumbing system 10—the current value(s) of the parameter(s) can be determined based on readings from the sensor(s), such as the activation sensor 38a, the parameter or position sensor 40, the temperature sensor 74, the flow sensor 76, the pressure sensor 78, and/or the valve sensor 80, e.g., the current system state is active, the current valve state is open, the current temperature is 60° F., the current flow rate is 50%, and the current spray pattern is stream; and 2. the selected value(s) of at least one of the parameter(s) for the water delivered through the discharge outlet 24 of the electronic plumbing system 10—the selected value(s) of the parameter(s) can be determined based on readings from the sensor(s), such as the activation sensor 38a and/or the parameter or position sensor 40, e.g., the selected system state is hold, the selected valve state is open, the selected temperature is 110° F., the selected flow rate is 100%, and the selected spray pattern is stream.

In exemplary embodiments, as best shown in FIGS. 11a-11f, the activation display 38b is operable to convey to the user the information set forth above as follows:

1. the current value of each parameter is shown using an indicator or an array of indicators for each parameter, for example:

a. the indicator represents a value of the parameter, and the indicator is illuminated when the parameter is currently that value and not illuminated when the parameter is not currently that value (i.e., is currently another value), e.g., the indicator is illuminated when the system state is currently active and not illuminated when the system state is not currently active (i.e., is currently hold or inactive);

b. each indicator in the array represents a value of the parameter, and the indicator for a value is illuminated when the parameter is currently that value and the indicators for the other values are not illuminated, e.g., a first indicator is illuminated when the system state is currently active, a second indicator is illuminated when the system state is currently hold, and a third indicator is illuminated when the system state is currently inactive; and c. each indicator in the array represents a range of values of the parameter, and the indicator for a range of values is illuminated when the parameter is currently in that range of values and the indicators for the other ranges of values are not illuminated, e.g., a dark blue indicator represents less than or equal to 67° F., a light blue indicator represents 68° F.-77° F., a dark purple indicator represents 78° F.-87° F., a light purple indicator represents 88° F.-97° F., a light red indicator represents 98° F.-107° F., and a dark red indicator represents greater than or equal to 108° F., and each indicator is illuminated when the temperature is currently in the corresponding range of values for the indicator; and 2. the selected value of each parameter is shown using an indicator or an array of indicators for each parameter, for example:

a. the indicator represents a value of the parameter, and the indicator is illuminated when the parameter is selected to be that value and not illuminated when the parameter is not selected to be that value (i.e., is selected to be another value), e.g., the indicator is illuminated when the system state is selected to be active and not illuminated when the system state is not selected to be active (i.e., is selected to be hold or inactive);

b. each indicator in the array represents a value of the parameter, and the indicator for a value is illuminated when the parameter is selected to be that value and the indicators for the other values are not illuminated, e.g., a first indicator is illuminated when the system state is selected to be active, a second indicator is illuminated when the system state is selected to be hold, and a third indicator is illuminated when the system state is selected to be inactive; and c. each indicator in the array represents a range of values of the parameter, and the indicator for a range of values is illuminated when the parameter is selected to be in that range of values and the indicators for the other ranges of values are not illuminated, e.g., a dark blue indicator represents coldest temperature available or 65° F., a light blue indicator represents 70° F. or 75° F., a dark purple indicator represents 80° F. or 85° F., a light purple indicator represents 90° F. or 95° F., a light red indicator represents 100° F. or 105° F., and a dark red indicator represents 110° F. or hottest temperature available, and each indicator is illuminated when the temperature is selected to be in the corresponding range of values for the indicator; and The activation display 38b of FIGS. 11a-11f is further explained below with regard to an exemplary embodiment where the user has moved the object to any position for the first predetermined period of time, then moved the object to the position or activation subzone representing 110° F., and then held the object in any position for the second predetermined period of time:

1. FIG. 11a shows the activation display 38b when the system state is currently active, the current temperature is 60° F., and the selected temperature is 110° F.—thus, the active current value indicator is illuminated, the dark blue current value indicator is illuminated, and the dark red selected value indicator is illuminated;

2. FIG. 11b shows the activation display 38b when the system state is currently hold, the current temperature is 70° F., and the selected temperature is 110° F.—thus, the active current value indicator is not illuminated, the light blue current value indicator is illuminated, and the dark red selected value indicator is illuminated;

3. FIG. 11c shows the activation display 38b when the system state is currently hold, the current temperature is 80° F., and the selected temperature is 110° F.—thus, the active current value indicator is not illuminated, the dark purple current value indicator is illuminated, and the dark red selected value indicator is illuminated;

4. FIG. 11d shows the activation display 38b when the system state is currently hold, the current temperature is 90° F., and the selected temperature is 110° F.—thus, the active current value indicator is not illuminated, the light purple current value indicator is illuminated, and the dark red selected value indicator is illuminated;

5. FIG. 11e shows the activation display 38b when the system state is currently hold, the current temperature is 100° F., and the selected temperature is 110° F.—thus, the active current value indicator is not illuminated, the light red current value indicator is illuminated, and the dark red selected value indicator is illuminated; and 6. FIG. 11f shows the activation display 38b when the system state is currently hold, the current temperature is 110° F., and the selected temperature is 110° F.—thus, the active current value indicator is not illuminated, the dark red current value indicator is illuminated, and the dark red selected value indicator is illuminated.

In exemplary embodiments, as best shown in FIGS. 12a-12f, the activation display 38b is operable to convey to the user the information set forth above as follows:

1. the current value(s) of the parameter(s) are shown using textual/numeric indicator(s); and
2. the selected value(s) of the parameter(s) are shown using textual/numeric indicator(s).

The activation display 38b of FIGS. 12a-12f is further explained below with regard to an exemplary embodiment where the user has moved the object to any position for the first predetermined period of time, then moved the object to the position or activation subzone representing 110° F. and 100% flow rate, and then held the object in any position for the second predetermined period of time:

1. FIG. 12a shows the activation display 38b when the system state is currently active, the current temperature is 60° F., the current flow rate is 50%, the selected temperature is 110° F., and the selected flow rate is 100%—thus, the state current value indicator displays "active," the other current value indicators display the appropriate values, and the selected value indicators display the appropriate values;
2. FIG. 12b shows the activation display 38b when the system state is currently hold, the current temperature is 70° F., the current flow rate is 60%, the selected temperature is 110° F., and the selected flow rate is 100%—thus, the state current value indicator displays "hold," the other current value indicators display the appropriate values, and the selected value indicators display the appropriate values;
3. FIG. 12c shows the activation display 38b when the system state is currently hold, the current temperature is 80° F., the current flow rate is 70%, the selected temperature is 110° F., and the selected flow rate is 100%—thus, the state current value indicator displays "hold," the other current value indicators display the appropriate values, and the selected value indicators display the appropriate values;
4. FIG. 12d shows the activation display 38b when the system state is currently hold, the current temperature is 90° F., the current flow rate is 80%, the selected temperature is 110° F., and the selected flow rate is 100%—thus, the state current value indicator displays "hold," the other current value indicators display the appropriate values, and the selected value indicators display the appropriate values;
5. FIG. 12e shows the activation display 38b when the system state is currently hold, the current temperature is 100° F., the current flow rate is 90%, the selected temperature is 110° F., and the selected flow rate is 100%—thus, the state current value indicator displays "hold," the other current value indicators display the appropriate values, and the selected value indicators display the appropriate values; and
6. FIG. 12f shows the activation display 38b when the system state is currently hold, the current temperature is 110° F., the current flow rate is 100%, the selected temperature is 110° F., and the selected flow rate is 100%—thus, the state current value indicator displays "hold," the other current value indicators display the appropriate values, and the selected value indicators display the appropriate values.

In exemplary embodiments, the indicators for conveying to the user the information set forth above are combined. For example, instead of showing the current system state using a separate indicator that is illuminated when the system state is currently active and not illuminated when the system state is not currently active (i.e., is currently hold or inactive), the current system state could be shown by flashing the array of indicators for the current value of another parameter (e.g., temperature) while the system state is currently active and not flashing the array of indicators for the current value of another parameter (e.g., temperature) while the system state is not currently active (i.e., is currently hold or inactive).

In exemplary embodiments, the activation display 38b is operable to provide visual feedback. In exemplary embodiments, the activation display 38b includes a light emitting diode ("LED"). In exemplary embodiments, the LED displays different colors and/or different flashing patterns. In exemplary embodiments, a short flashing pattern is in the range of approximately 0.1 second to 0.5 second, and a long flashing pattern is greater than approximately 0.5 second. For example, the LED of the activation display 38b could display a short flashing pattern when the system state is currently active, a long flashing pattern when the system state is currently hold, and no flashing pattern when the system state is currently inactive. In exemplary embodiments, the activation display 38b includes a screen. In exemplary embodiments, the screen displays at least one of symbols, numbers, and characters.

In exemplary embodiments, the activation display 38b is operable to provide audible feedback. In exemplary embodiments, the activation display 38b includes a voice. In exemplary embodiments, the activation display 38b includes a beep or a tone. For example, the activation display 38b could make a beep or a tone when a desired temperature is reached. Similarly, the activation display 38b could make a beep or a tone when the system state changes between active, hold, and inactive. In exemplary embodiments, the activation display 38b is operable to provide haptic feedback.

Figure 13A:
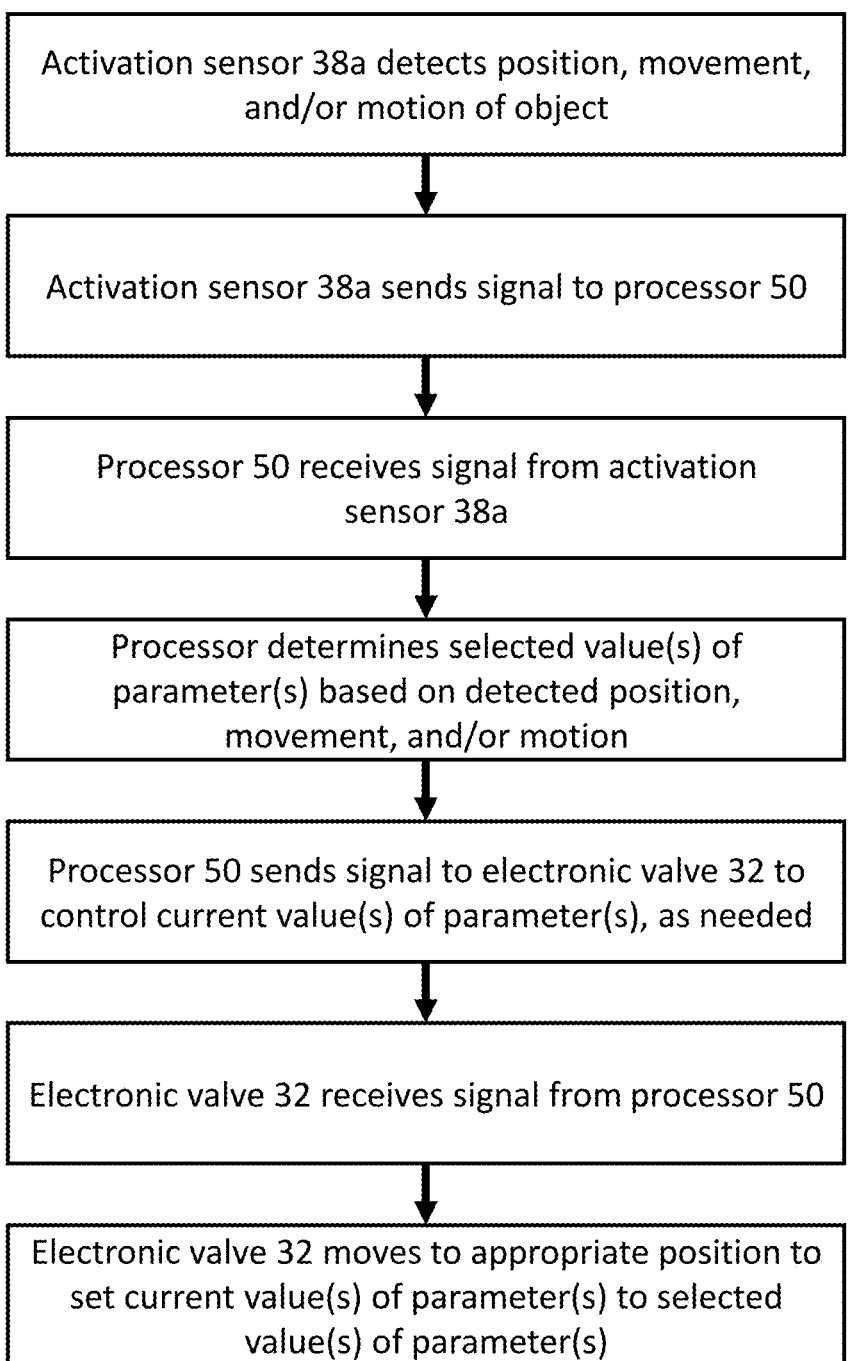
FIGS. 13*a*-13*c* are flowcharts illustrating operation of an electronic plumbing system including spatial tracking and feedback according to an exemplary embodiment of the present invention.

In exemplary embodiments, during operation of the electronic plumbing system 10, once the activation sensor 38a detects a position, movement, and/or motion of the object in the activation zone or in one of the activation subzones, the activation sensor 38a sends a signal to the processor 50 indicating the detected position, movement, and/or motion in the activation zone or in one of the activation subzones. The processor 50 receives the signal from the activation sensor 38a and determines the selected value(s) of the parameter(s) for the water delivered through the discharge outlet 24 of the electronic plumbing system 10 based on the detected position, movement, and/or motion of the object in the activation zone or in one of the activation subzones (e.g., using the lookup table or similar data structure). The processor 50 sends a signal to the electronic valve 32 to control the current value(s) of the parameter(s) (i.e., to set the current value(s) of the parameter(s) to the selected value(s) of the parameter(s)), as needed. The electronic valve 32 receives the signal from the processor 50 and moves to an appropriate position to set the current value(s) of the parameter(s) to the selected value(s) of the parameter(s). Exemplary positions include a cracked open position, a closed position, or any position between the cracked open position and the closed position to achieve the selected value(s) of the parameter(s) (e.g., the selected valve state, temperature, flow rate, volume, and/or spray pattern of water). These exemplary steps are illustrated in FIG. 13a. These steps are repeated each time the activation sensor 38a detects a position, movement, and/or motion of the object in the activation zone or in one of the activation subzones.

Figure 13B:
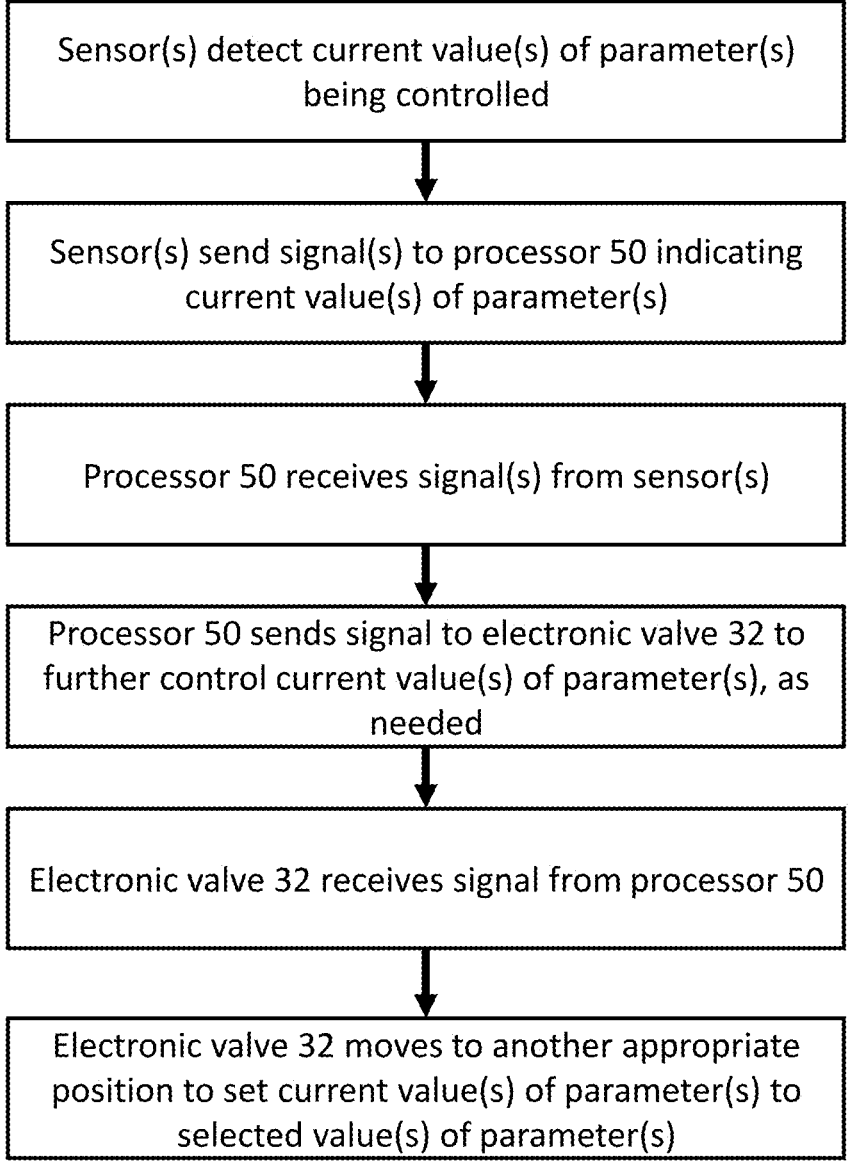

Depending on the parameter(s) being controlled, the sensor(s) (e.g., the temperature sensor 74, the flow sensor 76, the pressure sensor 78, and/or the valve sensor 80) detect the current value(s) of the parameter(s) being controlled and send signal(s) to the processor 50 indicating the current value(s) of the parameter(s). The processor 50 receives the signal(s) from the sensor(s) (e.g., the temperature sensor 74, the flow sensor 76, the pressure sensor 78, and/or the valve sensor 80) and sends a signal to the electronic valve 32 to further control the current value(s) of the parameter(s) (i.e., to set the current value(s) of the parameter(s) to the selected value(s) of the parameter(s)), as needed. The electronic valve 32 receives the signal from the processor 50 and moves to another appropriate position to set the current value(s) of the parameter(s) to the selected value(s) of the parameter(s). These exemplary steps are illustrated in FIG. 13*b*. These steps are repeated until the current value(s) of the parameter(s) are set to the selected value(s) of the parameter(s).

Figure 13C:
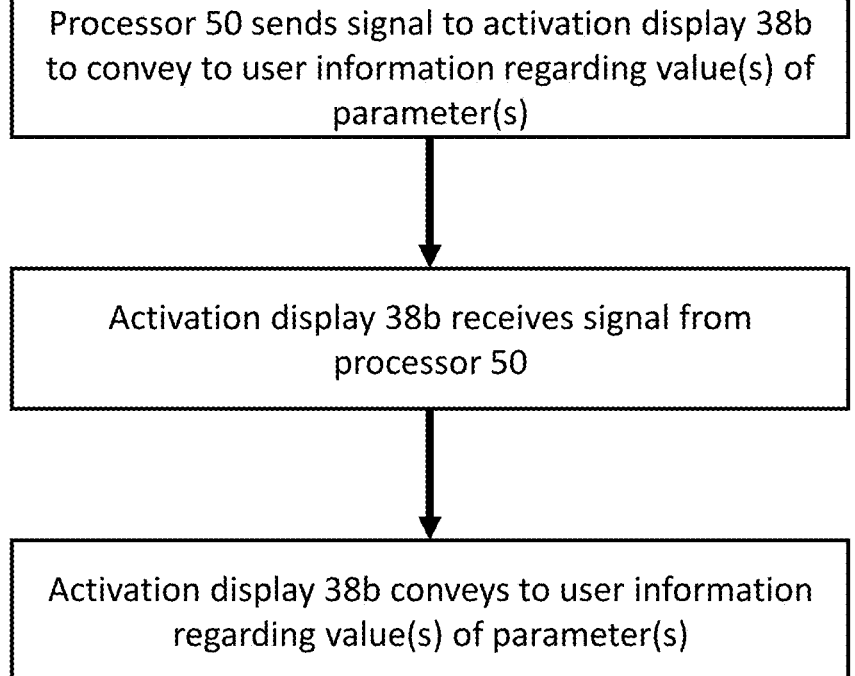

Moreover, the processor 50 sends a signal to the activation display 38*b* to convey to the user information regarding the value(s) of the parameter(s) for the water delivered through the discharge outlet 24 of the electronic plumbing system 10 (e.g., the indication of the current value(s) of the parameter(s) delivered through the discharge outlet 24 of the electronic plumbing system 10, and/or the indication of the selected value(s) of the parameter(s) delivered through the discharge outlet 24 of the electronic plumbing system 10). The activation display 38*b* receives the signal from the processor 50 and conveys to the user the information regarding the value(s) of the parameter(s). These exemplary steps are illustrated in FIG. 13*c*. These steps are repeated each time there is information for the activation display 38*b* to convey to the user.

In the exemplary embodiments described above, the signals received from and sent to the components of the electronic plumbing system 10 (e.g., the activation sensor 38*a*, other sensors, the activation display 38*b*, and the electronic valve 32) to control the operation of the electronic plumbing system 10 are received from and sent to the processor 50 in the control module 42. However, as stated above, one of ordinary skill in the art will appreciate that the signals received from and sent to the components of the electronic plumbing system 10 (e.g., the activation sensor 38*a*, other sensors, the activation display 38*b*, and the electronic valve 32) can be received from and sent to the processor 58*a* in the system provider cloud server 58 and/or the processor 60*a* in the third party cloud server 60 in addition to or alternatively to the processor 50 in the control module 42.

The following includes definitions of exemplary terms that may be used throughout the disclosure. Both singular and plural forms of all terms fall within each meaning.

"Computer" or "processor," as used herein includes, but is not limited to, one or more programmed or programmable electronic device or coordinated devices that can store, retrieve, or process data and may be any processing unit, distributed processing configuration, or processor systems. Examples of processor include microprocessors, microcontrollers, central processing units (CPUs), graphics processing units (GPUs), tensor processing unit (TPU), floating point units (FPUs), reduced instruction set computing (RISC) processors, digital signal processors (DSPs), field programmable gate arrays (FPGAs), etc., in any combination. One or more cores of a single microprocessor and/or multiple microprocessor each having one or more cores can be used to perform the operation as being executed by a processor herein. The processor can also be a processor dedicated to the training of neural networks and other artificial intelligence (AI) systems. The processor may be associated with various other circuits that support operation in the processor, such as random access memory (RAM), read-only memory (ROM), programmable read-only memory (PROM), erasable programmable read-only memory (EPROM), clocks, decoders, memory controllers, or interrupt controllers, etc. These support circuits may be internal or external to the processor or its associated electronic packaging. The support circuits are in operative communication with the processor. The support circuits are not necessarily shown separate from the processor in block diagrams or drawings.

"Network interface," synonymous with "data interface," as used herein includes, but is not limited to, any interface or protocol for transmitting and receiving data between electronic devices. The network or data interface can refer to a connection to a computer via a local network or through the internet and can also refer to a connection to a portable device—e.g., a mobile device or a USB thumb drive—via a wired or wireless connection. A network interface can be used to form networks of computers to facilitate distributed and/or remote computing (i.e., cloud-based computing). "Cloud-based computing" means computing that is implemented on a network of computing devices that are remotely connected to the device via a network interface.

"Signal," as used herein includes, but is not limited to, one or more electric signals, including analog or digital signals, one or more computer instructions, a bit or bit stream, or the like.

"Logic," synonymous with "circuit," as used herein includes but is not limited to hardware, firmware, software and/or combinations of each to perform a function(s) or action(s). For example, based on a desired application or needs, logic may include a software-controlled microprocessor, discrete logic such as an application specific integrated circuit (ASIC), or other programmed logic device and/or controller. Logic may also be fully embodied as software. The logic flow of an embodiment of the invention could be embodied in logic.

"Software," as used herein includes, but is not limited to, one or more computer readable and/or executable instructions that cause a computer, processor, logic, and/or other electronic device to perform functions, actions, and/or behave in a desired manner. The instruments may be embodied in various forms such as routines, algorithms, modules, or programs including separate applications or code from dynamically linked sources or libraries (DLLs). Software may also be implemented in various forms such as a stand-alone program, a web-based program, a function call, a subroutine, a servlet, an application, an app, an applet (e.g., a Java applet), a plug-in, instructions stored in a memory, part of an operating system, or other type of executable instructions or interpreted instructions from which executable instructions are created. The logic flow of an embodiment of the invention could be embodied in software.

"Module" or "engine" as used herein will be appreciated as comprising various configurations of computer hardware and/or software implemented to perform operations. In some embodiments, modules or engines as described herein may be represented as instructions operable to be executed by a processor in a processor or memory. In other embodiments, modules or engines as described herein may be represented as instructions read or executed from readable media. A module or engine may operate in either hardware or software according to application specific parameters or user settings. It will be appreciated by those of skill in the art that such configurations of hardware and software may vary, but remain operable in substantially similar ways. The logic flow of an embodiment of the invention could be embodied in a module or engine.

"Data storage device," as used herein includes, but is not limited to, a device or devices for non-transitory storage of code or data, e.g., a device with a non-transitory computer readable medium. As used herein, "non-transitory computer readable medium" mean any suitable non-transitory computer readable medium for storing code or data, such as a magnetic medium, e.g., fixed disks in external hard drives, fixed disks in internal hard drives, and flexible disks; an optical medium, e.g., CD disk, DVD disk; and other media, e.g., ROM, PROM, EPROM, EEPROM, flash PROM, external memory drives, etc. The memory of an embodiment of the invention could be embodied in a data storage device.

While the above exemplary definitions have been provided, it is intended that the broadest reasonable interpretation consistent with this specification be used for these and other terms. Aspects and implementations of the present disclosure will be understood more fully from the detailed description given below and from the accompanying drawings of the various aspects and implementations of the disclosure. This should not be taken to limit the disclosure to the specific aspects or implementations, but is for explanation and understanding only.

One of ordinary skill in the art will now appreciate that the present invention provides an electronic plumbing system including spatial tracking and feedback. Although the present invention has been shown and described with reference to particular embodiments, equivalent alterations and modifications will occur to those skilled in the art upon reading and understanding this specification. The present invention includes all such equivalent alterations and modifications and is limited only by the scope of the following claims in light of their full scope of equivalents.

What is claimed is:

1. A system, comprising:

a body, the body operable to be mounted on a surface, the body including a discharge outlet, the discharge outlet operable to deliver water;

an electronic valve, the electronic valve operable to permit flow of water through the discharge outlet when the electronic valve is activated and to not permit flow of water through the discharge outlet when the electronic valve is deactivated, the electronic valve operable to control a parameter for water flowing through the discharge outlet;

a user input/output module, the user input/output module operable to communicate with a user regarding a selected value of the parameter for water, the user input/output module including an activation sensor, the activation sensor operable to define an activation zone, the activation sensor operable to detect at least one of a position, movement, and motion of an object in the activation zone, each position, movement, or motion of the object in the activation zone corresponding to a value of the parameter for water; and a processor, the processor operable to communicate with each of the electronic valve and the user input/output module regarding the selected value of the parameter for water;

wherein the system has an active system state, a hold system state, and an inactive system state;

wherein, in the active system state, water is being delivered through the discharge outlet, the position, movement, or motion of the object in the activation zone is determining the selected value of the parameter for water, and each change in the position, movement, or motion of the object in the activation zone results in a change in the selected value of the parameter for water;

wherein, in the hold system state, water is being delivered through the discharge outlet and the position, movement, or motion of the object in the activation zone is not determining the selected value of the parameter for water; and wherein, in the inactive system state, water is not being delivered through the discharge outlet.

2. The system of claim 1, wherein:

the activation zone has at least one dimension; and each dimension of the activation zone corresponds to one parameter for water.

3. The system of claim 1, wherein:

the activation zone has three dimensions;

a first dimension of the activation zone corresponds to a first parameter for water, the first parameter being a temperature of water;

a second dimension of the activation zone corresponds to a second parameter for water, the second parameter being a flow rate of water; and a third dimension of the activation zone corresponds to a third parameter for water, the third parameter being a spray pattern of water.

4. The system of claim 1, wherein:

the system is operable to enter the active system state when the system detects an activation sequence; and the activation sequence includes a first predetermined position, movement, or motion of the object in the activation zone.

5. The system of claim 1, wherein:

the system is operable to enter the hold system state when the system detects a hold sequence; and the hold sequence includes a second predetermined position, movement, or motion of the object in the activation zone.

6. The system of claim 1, wherein:

the system is operable to enter the inactive system state when the system detects a deactivation sequence; and the deactivation sequence includes a third predetermined position, movement, or motion of the object in the activation zone.

7. A system, comprising:

a body, the body operable to be mounted on a surface, the body including a discharge outlet, the discharge outlet operable to deliver water;

an electronic valve, the electronic valve operable to permit flow of water through the discharge outlet when the electronic valve is activated and to not permit flow of water through the discharge outlet when the electronic valve is deactivated, the electronic valve operable to control a parameter for water flowing through the discharge outlet;

a user input/output module, the user input/output module operable to communicate with a user regarding a selected value of the parameter for water, the user input/output module including an activation sensor, the activation sensor operable to define an activation zone, the activation sensor operable to detect at least one of a position, movement, and motion of an object in the activation zone, each position, movement, or motion of the object in the activation zone corresponding to a value of the parameter for water; and a processor, the processor operable to communicate with each of the electronic valve and the user input/output module regarding the selected value of the parameter for water;

wherein the system has an active system state, a hold system state, and an inactive system state;

wherein, in the active system state, water is being delivered through the discharge outlet and each change in the position, movement, or motion of the object in the activation zone results in a change in the selected value of the parameter for water;

wherein, in the hold system state, water is being delivered through the discharge outlet and no change in the position, movement, or motion of the object in the activation zone results in a change in the selected value of the parameter for water; and wherein, in the inactive system state, water is not being delivered through the discharge outlet.

8. The system of claim 7, wherein:

the activation zone has at least one dimension; and each dimension of the activation zone corresponds to one parameter for water.

9. The system of claim 7, wherein:

the activation zone has three dimensions;

a first dimension of the activation zone corresponds to a first parameter for water, the first parameter being a temperature of water;

a second dimension of the activation zone corresponds to a second parameter for water, the second parameter being a flow rate of water; and a third dimension of the activation zone corresponds to a third parameter for water, the third parameter being a spray pattern of water.

10. The system of claim 7, wherein:

the system is operable to enter the active system state when the system detects an activation sequence; and the activation sequence includes a first predetermined position, movement, or motion of the object in the activation zone.

11. The system of claim 7, wherein:

the system is operable to enter the hold system state when the system detects a hold sequence; and the hold sequence includes a second predetermined position, movement, or motion of the object in the activation zone.

12. The system of claim 7, wherein:

the system is operable to enter the inactive system state when the system detects a deactivation sequence; and the deactivation sequence includes a third predetermined position, movement, or motion of the object in the activation zone.

13. The system of claim 7, wherein:

the selected value of the parameter for water is set to the value of the parameter for water corresponding to the last detected position movement, or motion of the object in the activation zone in the active system state prior to entering the hold system state.

14. A system, comprising:

a body, the body operable to be mounted on a surface, the body including a discharge outlet, the discharge outlet operable to deliver water;

an electronic valve, the electronic valve operable to permit flow of water through the discharge outlet when the electronic valve is activated and to not permit flow of water through the discharge outlet when the electronic valve is deactivated, the electronic valve operable to control a parameter for water flowing through the discharge outlet;

a user input/output module, the user input/output module operable to communicate with a user regarding a selected value of the parameter for water, the user input/output module including an activation sensor, the activation sensor operable to define an activation zone, the activation sensor operable to detect at least one of a position, movement, and motion of an object in the activation zone, each position, movement, or motion of the object in the activation zone corresponding to a value of the parameter for water; and a processor, the processor operable to communicate with each of the electronic valve and the user input/output module regarding the selected value of the parameter for water;

wherein the system has an active system state, a hold system state, and an inactive system state;

wherein, in the active system state, water is being delivered through the discharge outlet and the position, movement, or motion of the object in the activation zone is determining the selected value of the parameter for water;

wherein, in the hold system state, water is being delivered through the discharge outlet, the position, movement, or motion of the object in the activation zone is not determining the selected value of the parameter for water, and the selected value of the parameter for water is set to the value of the parameter for water corresponding to the last detected position, movement, or motion of the object in the activation zone in the active system state prior to entering the hold system state; and wherein, in the inactive system state, water is not being delivered through the discharge outlet.

15. The system of claim 14, wherein:

the activation zone has at least one dimension; and each dimension of the activation zone corresponds to one parameter for water.

16. The system of claim 14, wherein:

the activation zone has three dimensions;

a first dimension of the activation zone corresponds to a first parameter for water, the first parameter being a temperature of water;

a second dimension of the activation zone corresponds to a second parameter for water, the second parameter being a flow rate of water; and a third dimension of the activation zone corresponds to a third parameter for water, the third parameter being a spray pattern of water.

17. The system of claim 14, wherein:

the system is operable to enter the active system state when the system detects an activation sequence; and the activation sequence includes a first predetermined position, movement, or motion of the object in the activation zone.

18. The system of claim 14, wherein:

the system is operable to enter the hold system state when the system detects a hold sequence; and the hold sequence includes a second predetermined position, movement, or motion of the object in the activation zone.

19. The system of claim 14, wherein:

the system is operable to enter the inactive system state when the system detects a deactivation sequence; and the deactivation sequence includes a third predetermined position, movement, or motion of the object in the activation zone.

20. The system of claim 14, wherein:

each change in the position, movement, or motion of the object in the activation zone results in a change in the selected value of the parameter for water.

\* \* \* \* \*